(12) United States Patent
Lim et al.

(10) Patent No.: US 12,015,483 B2
(45) Date of Patent: Jun. 18, 2024

(54) REPEATED TRANSMISSION OF CONTROL FIELDS FOR ROBUST TRANSMISSION

(71) Applicant: LG Electronics Inc., Seoul (KR)

(72) Inventors: Dongguk Lim, Seoul (KR); Jinsoo Choi, Seoul (KR); Eunsung Park, Seoul (KR); Insun Jang, Seoul (KR)

(73) Assignee: LG Electronics Inc., Seoul (KR)

(*) Notice: Subject to any disclaimer, the term of this patent is extended or adjusted under 35 U.S.C. 154(b) by 332 days.

(21) Appl. No.: 17/610,290

(22) PCT Filed: May 8, 2020

(86) PCT No.: PCT/KR2020/006106
§ 371 (c)(1),
(2) Date: Nov. 10, 2021

(87) PCT Pub. No.: WO2020/231103
PCT Pub. Date: Nov. 19, 2020

(65) Prior Publication Data
US 2022/0231788 A1    Jul. 21, 2022

(30) Foreign Application Priority Data

May 10, 2019  (KR) .................. 10-2019-0055287
Aug. 12, 2019  (KR) .................. 10-2019-0098219
(Continued)

(51) Int. Cl.
*H04L 1/00* (2006.01)
*H04W 4/40* (2018.01)
*H04W 84/12* (2009.01)

(52) U.S. Cl.
CPC ............. *H04L 1/0091* (2013.01); *H04W 4/40* (2018.02); *H04W 84/12* (2013.01)

(58) Field of Classification Search
CPC ... H04L 1/0091; H04L 1/0625; H04L 1/0631; H04L 1/0041; H04L 1/0045;
(Continued)

(56) References Cited

U.S. PATENT DOCUMENTS

2017/0373910 A1* 12/2017 Shahmohammadian ..................... H04L 5/0048
2019/0036754 A1*  1/2019 Lee ..................... H04L 27/2607
(Continued)

FOREIGN PATENT DOCUMENTS

KR   20170126448    11/2017
WO   WO2017065543   4/2017

OTHER PUBLICATIONS

Lim et al., "Consideration on Features for 11bd," IEEE 802.11-19/0009r0, Jan. 2019, 15 pages.
(Continued)

*Primary Examiner* — Khoa Huynh
(74) *Attorney, Agent, or Firm* — Fish & Richardson P.C.

(57) ABSTRACT

In a wireless local area network (LAN) system, a station (STA) generates an NGV PPDU, wherein the NGV PPDU comprises: a first legacy control field; a second legacy control field in which the first legacy control field is repeated; a first NGV control field; a second NGV control field in which the first NGV control field is repeated; an NGV-short training field (NGVSTF); and an NGV-long training field (NGV-LTF), and the first NGV control field is consecutive to the second legacy control field, the second NGV control field is consecutive to the first NGV control field, and the control information may include 1-bit information related to the NGV-LTF. The STA may transmit the NGV PPDU.

16 Claims, 35 Drawing Sheets

(30) Foreign Application Priority Data

Aug. 12, 2019 (KR) ........................ 10-2019-0098418
Sep. 25, 2019 (KR) ........................ 10-2019-0118437

(58) Field of Classification Search
CPC ....... H04L 1/0072; H04L 1/0075; H04L 5/00; H04L 1/08; H04L 27/26; H04W 4/40; H04W 84/12
See application file for complete search history.

(56) References Cited

U.S. PATENT DOCUMENTS

2019/0268739 A1* 8/2019 Cariou ................ H04L 27/2603
2021/0050962 A1* 2/2021 Yu ........................ H04L 5/0091

OTHER PUBLICATIONS

Lim et al., "PHY designs for 11bd," IEEE 802.11-19/332r2, Mar. 2019, 24 pages.
Noh & Hwang, "PHY designs for NGV," IEEE 802.11-19/0293r0, Mar. 2019, 21 pages.

* cited by examiner (a)

(b)

PPDU Format (IEEE 802.11a/g)

HT PPDU Format (IEEE 802.11n)

VHT PPDU Format (IEEE 802.11ac)

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

| 10MHz | L-STF | L-LTF | L-SIG | RL-SIG | NGV-SIG | RNGV-SIG | NGV-STF | NGV-LTF | NGV Data |
| 10MHz | L-STF | L-LTF | L-SIG | RL-SIG | NGV-SIG | RNGV-SIG | | | NGV Data |

3000

REPEATED TRANSMISSION OF CONTROL FIELDS FOR ROBUST TRANSMISSION

CROSS-REFERENCE TO RELATED APPLICATIONS

This application is a National Stage application under 35 U.S.C. § 371 of International Application No. PCT/KR2020/006106, filed on May 8, 2020, which claims the benefit of Korean Patent Application No. 10-2019-0055287, filed on May 10, 2019, Korean Patent Application No. 10-2019-0098219, filed on Aug. 12, 2019, Korean Patent Application No. 10-2019-0098418, filed on Aug. 12, 2019, and Korean Patent Application No. 10-2019-0118437, filed on Sep. 25, 2019. The disclosures of the prior applications are incorporated by reference in their entirety.

BACKGROUND OF THE DISCLOSURE

Field of the Disclosure

The present specification relates to a method for extended range transmission and robust transmission in a wireless local area network (WLAN) system.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

The present specification either enhances the conventional (or existing) IEEE 802.11p specification or proposes technical characteristics that can be used in a new communication standard. The new communication standard may be a Next Generation V2X (NGV) standard, which is currently being discussed.

Meanwhile, in the IEEE standard, various types or formats of Physical Protocol Data Units (PPDUs) are defined. Transmitting and receiving stations (STA) may be configured to use an auto-detection rule to identify the type/format of the PPDU being transmitted and received.

SUMMARY OF THE DISCLOSURE

Technical Objects

A method performed by a station (STA) in a wireless local area network (WLAN) system according to various embodiments is a method of repeatedly transmitting a control field (e.g., an NGV-SIG field) for robust transmission. The STA may generate a next generation V2X (NGV) physical protocol data unit (PPDU). The NGV PPDU may comprise a first legacy control field, a second legacy control field in which the first legacy control field is repeated, a first NGV control field, a second NGV control field in which the first NGV control field is repeated, an NGV short training field (STF), and an NGV long training field (LTF). The second legacy control field is contiguous to the first legacy control field, the first NGV control field is contiguous to the second legacy control field, and the second NGV control field is contiguous to the first NGV control field, the NGV-STF is continuous to the second NGV control field, and the NGV-LTF is continuous to the NGV-STF. The first and second NGV control fields may comprise control information required for interpreting the NGV PPDU. The control information includes 1-bit information related to the NGV-LTF. The STA may transmit the NGV PPDU.

According to an example of the present specification, the control field of the NGV PPDU may be repeatedly transmitted. Accordingly, more robust transmission can be performed, and the transmission range can be extended. Since the control field is repeated in the time domain, it is easy to implement the repeated transmission, and a gain can be obtained when a channel changes over time.

According to an example of the present specification, power boosting may be applied to the legacy training field when a specific condition is satisfied. Through power boosting, more robust transmission and the effect of extending the transmission distance can be obtained.

BRIEF DESCRIPTION OF THE DRAWINGS

FIG. 18 illustrates an example of a PPDU used in the present specification.

FIG. 20 shows an example of various types of PPDUs.

FIGS. 29 and 30 are diagrams illustrating an embodiment of a PPDU format.

DESCRIPTION OF EXEMPLARY EMBODIMENTS

Figure 1:
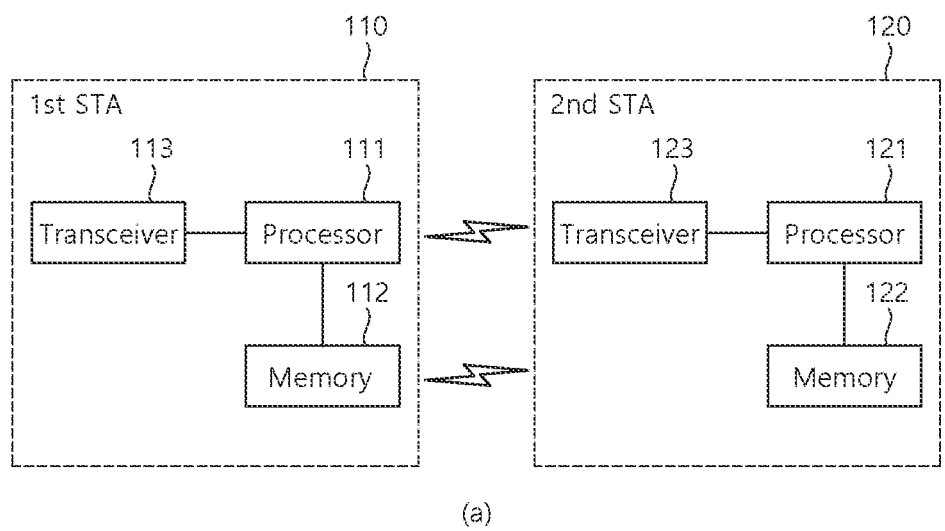
FIG. 1 shows an example of a transmitting apparatus and/or receiving apparatus of the present specification.
Figure 1:
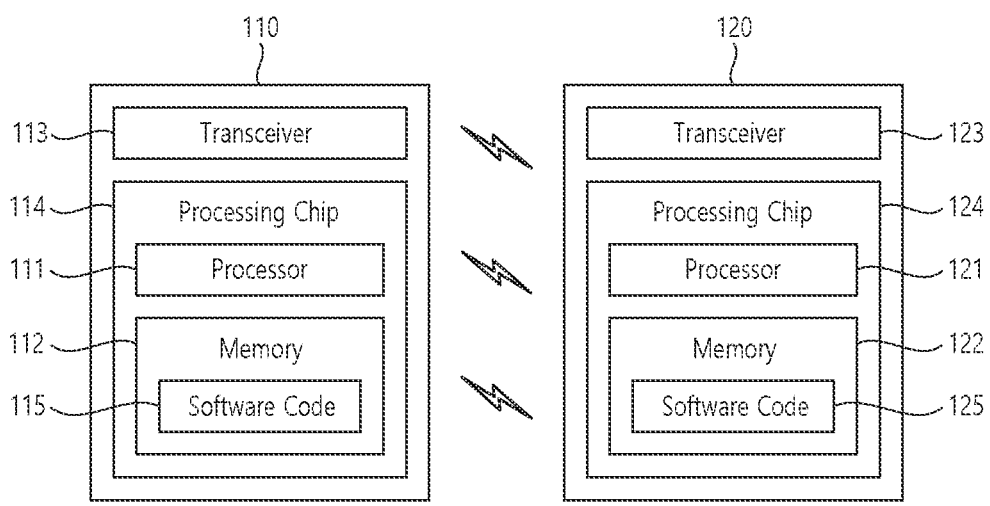

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120.

For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
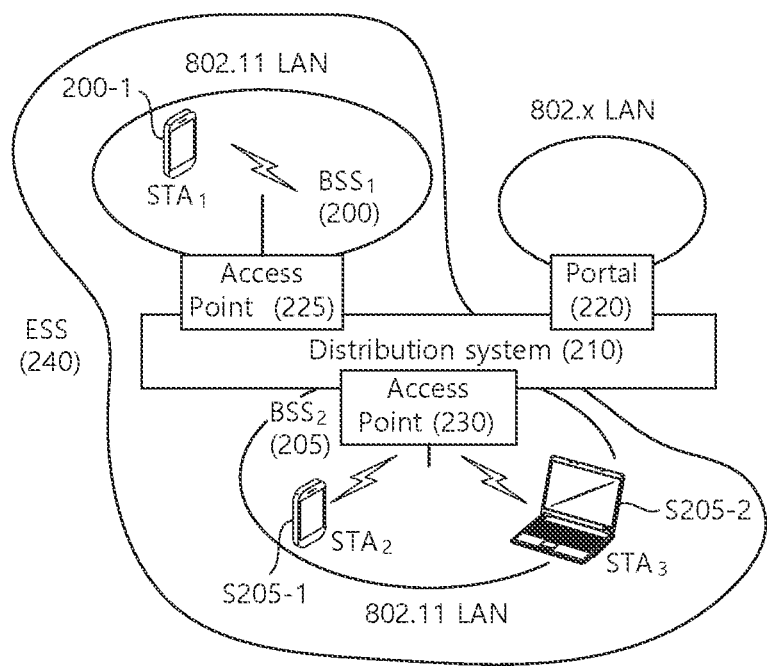
FIG. 2 is a conceptual view illustrating the structure of a wireless local area network (WLAN).
Figure 2:
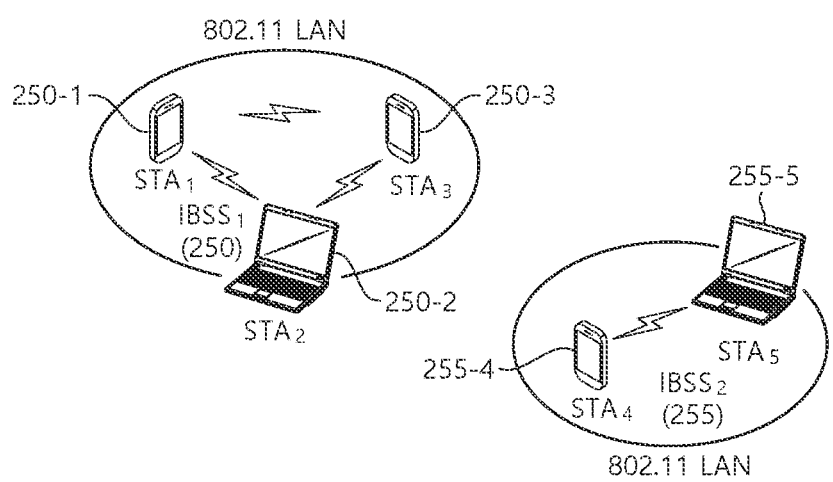

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
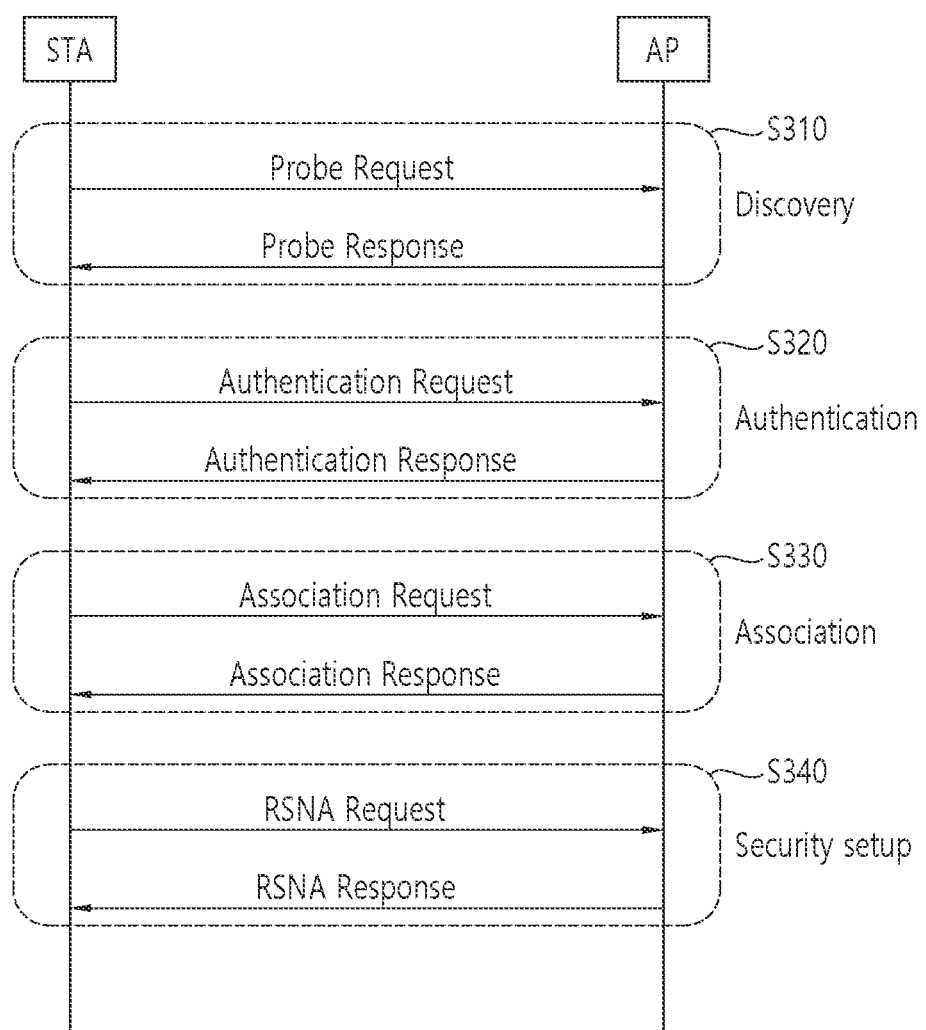
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
FIG. 4 illustrates an example of a PPDU used in an IEEE standard.
Figure 4:
Figure 4:
Figure 4:
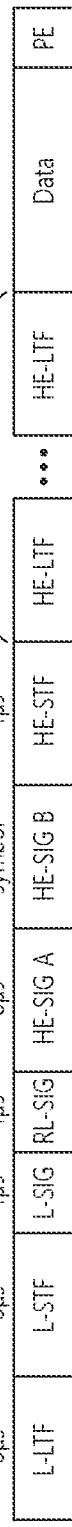

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
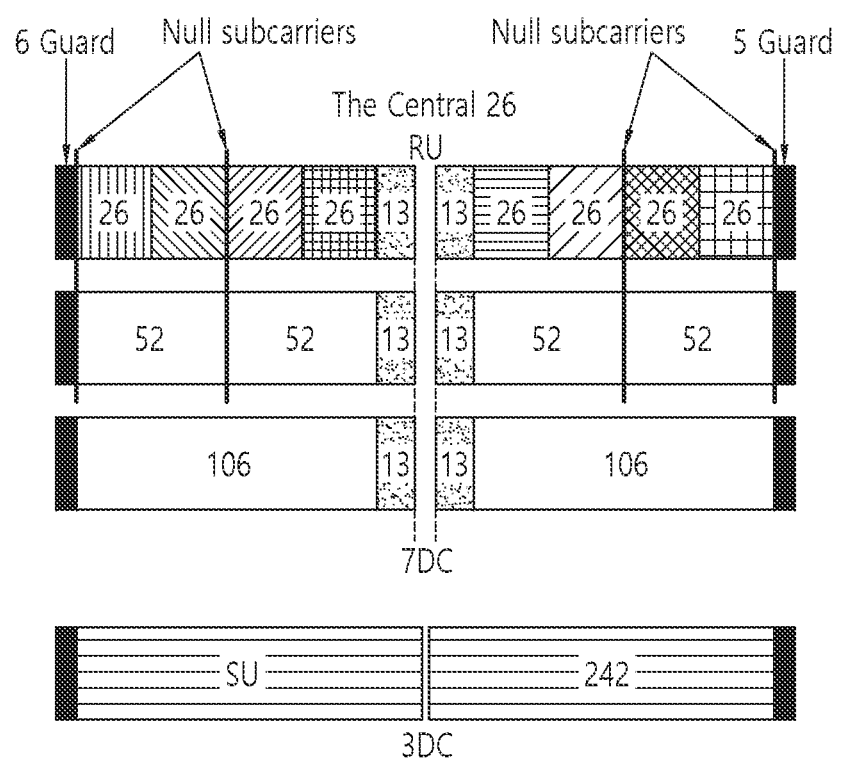
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
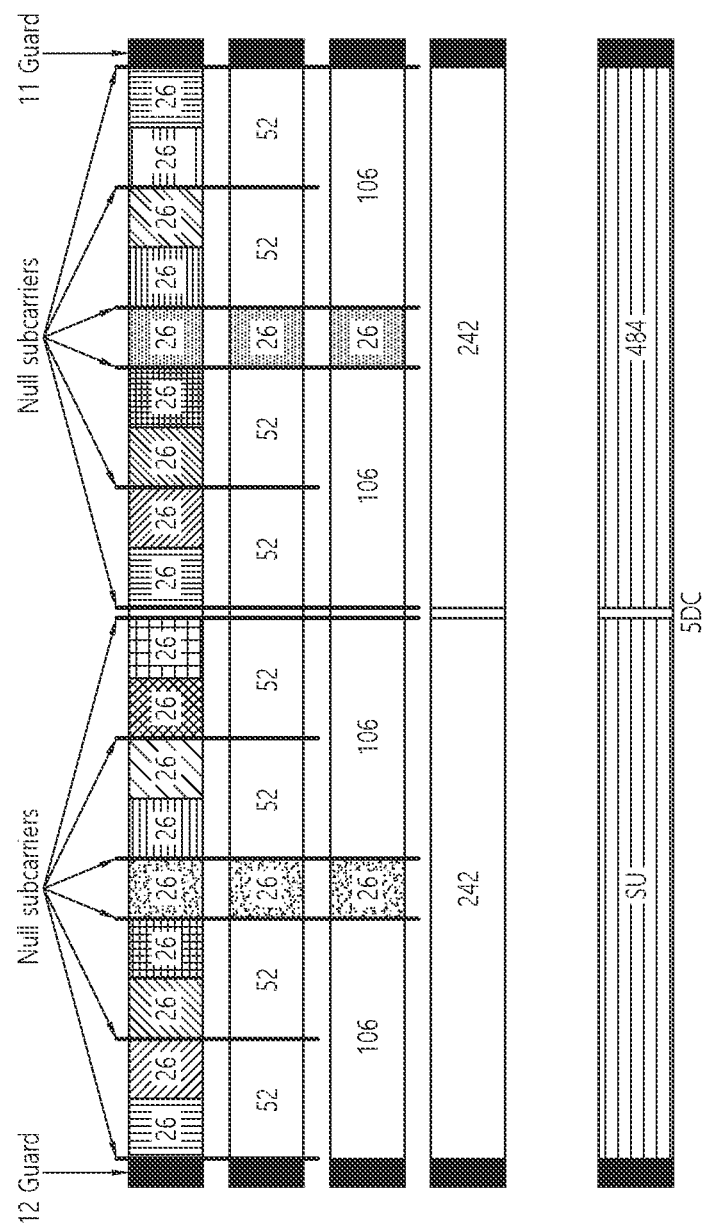
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
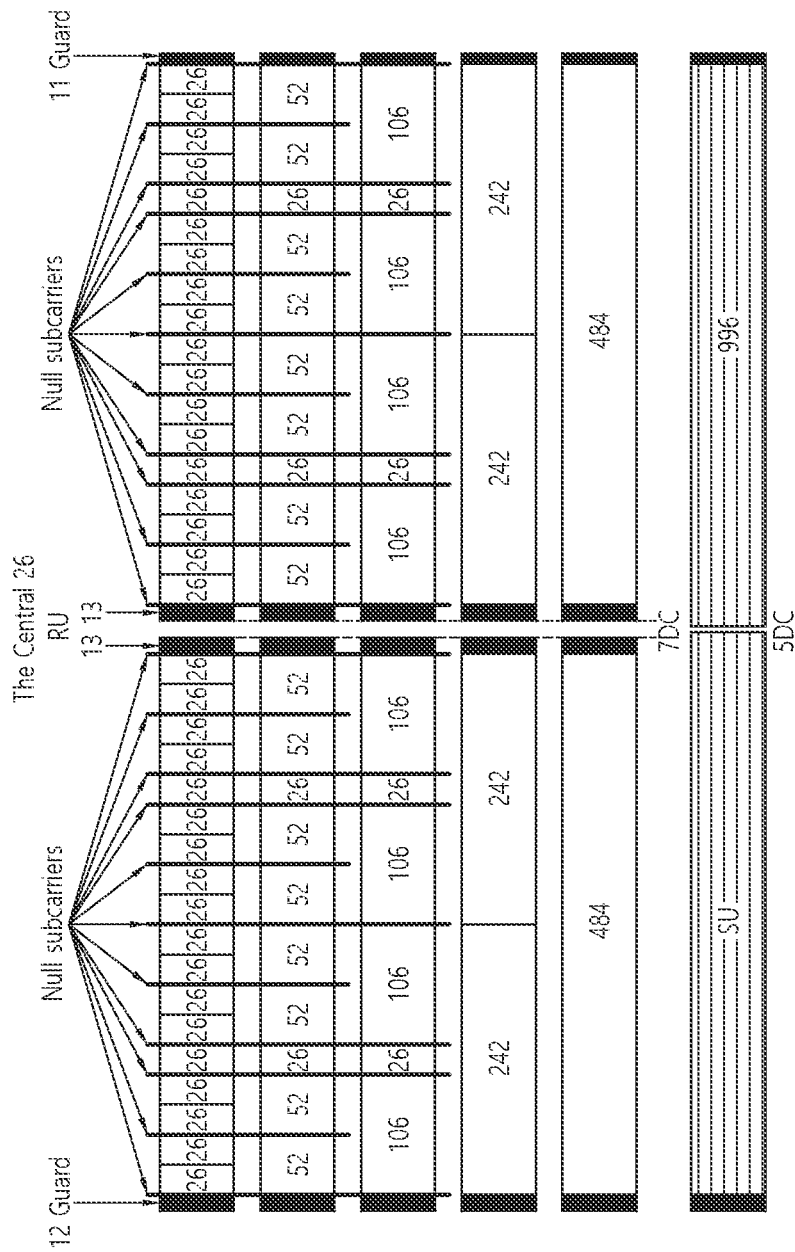
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
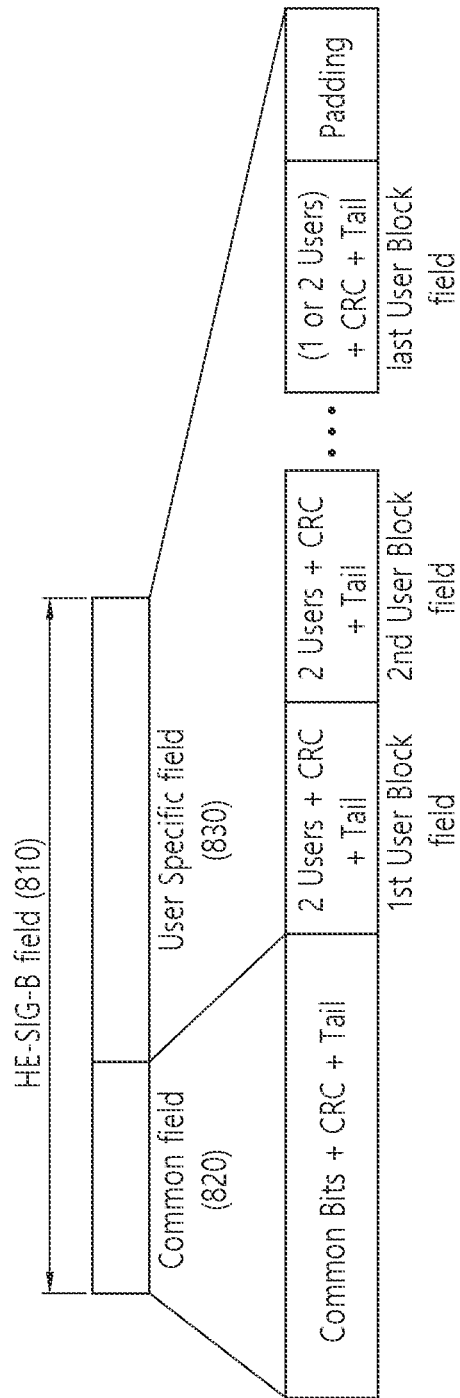
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |

TABLE 1-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 … B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 … B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
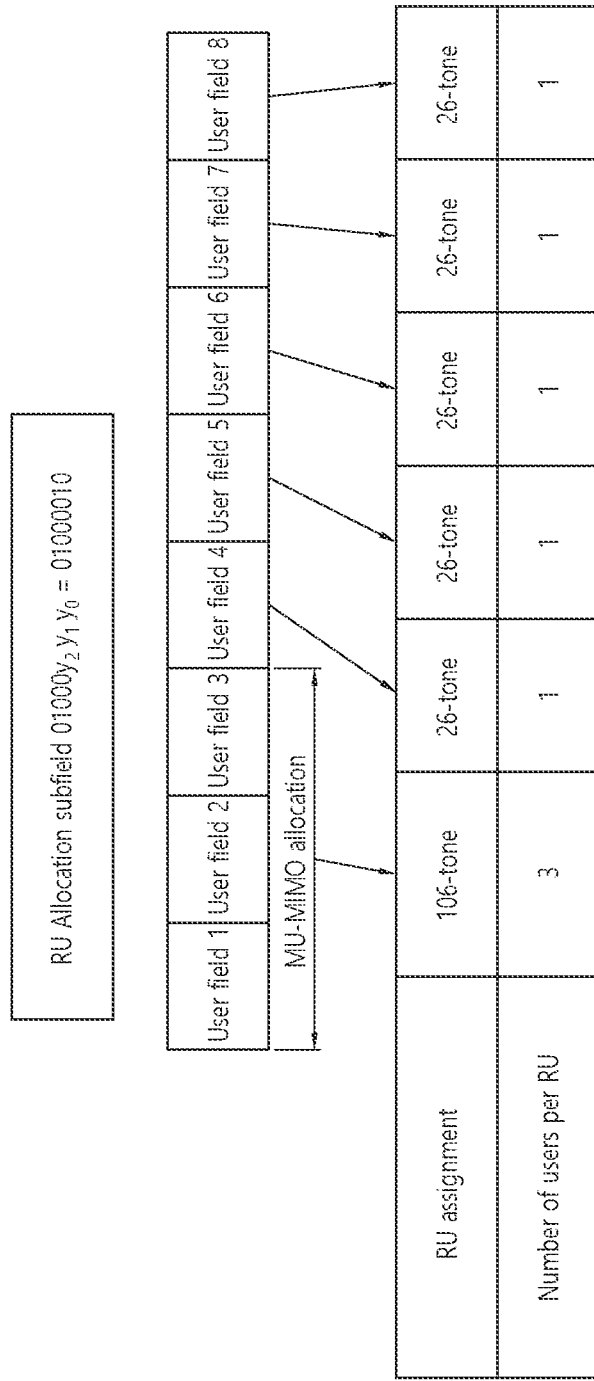
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
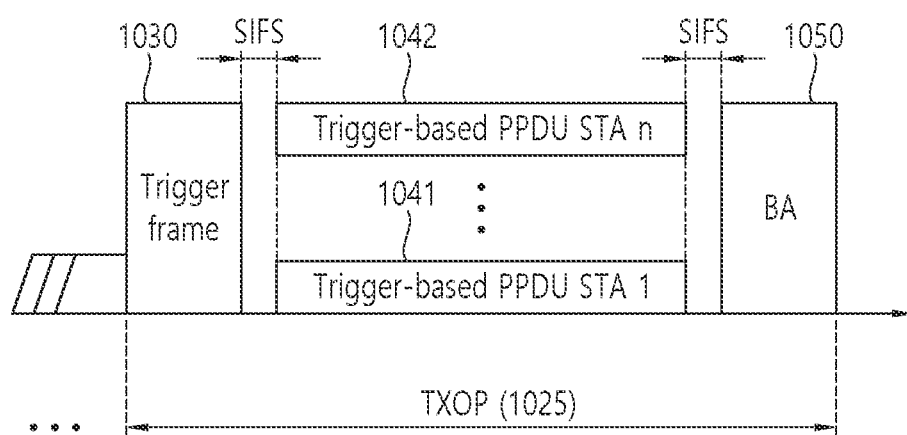
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
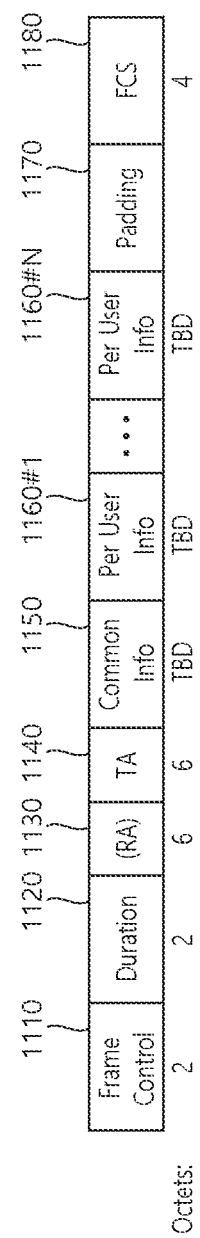
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
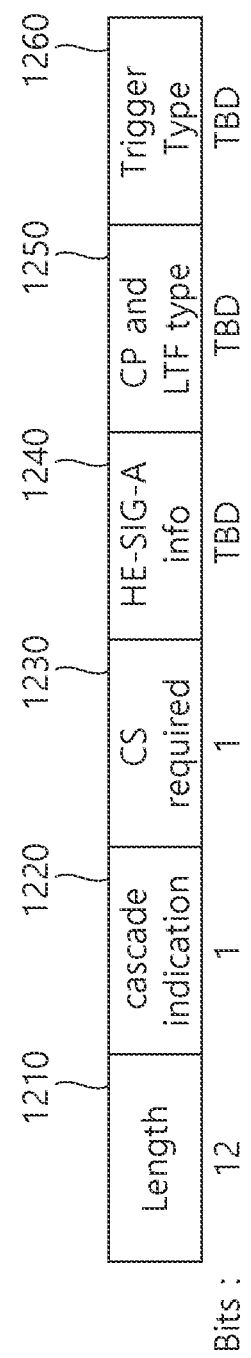
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
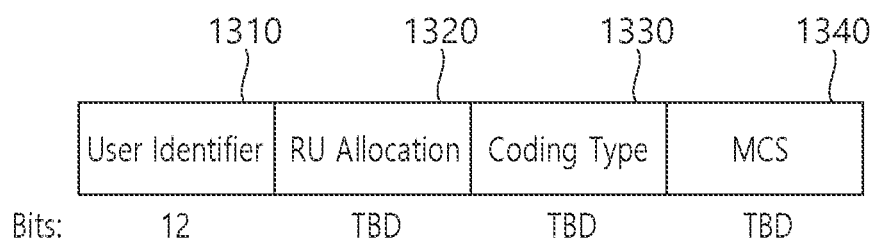
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
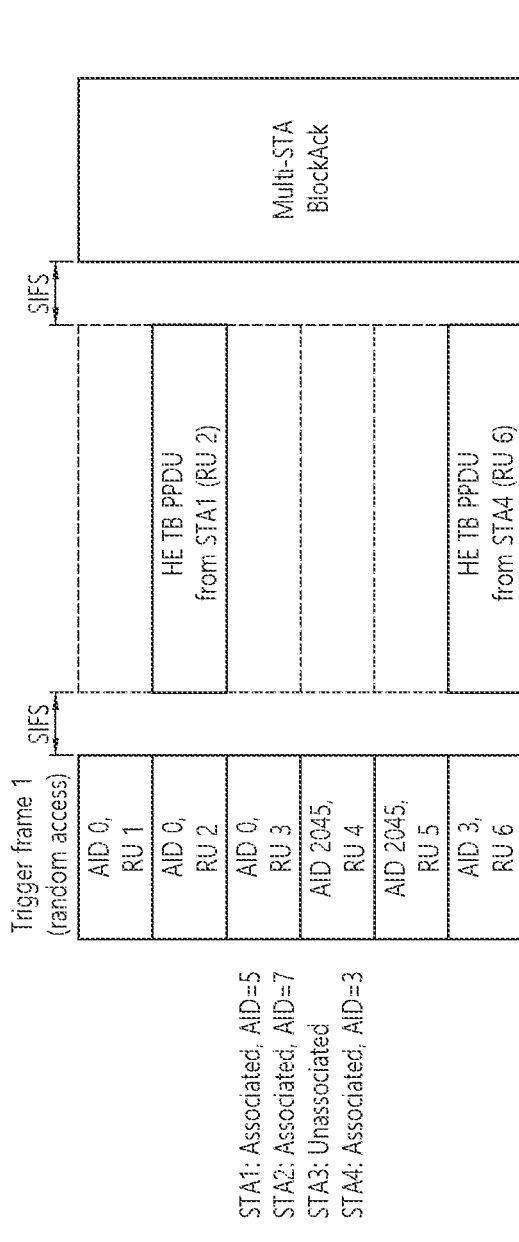
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
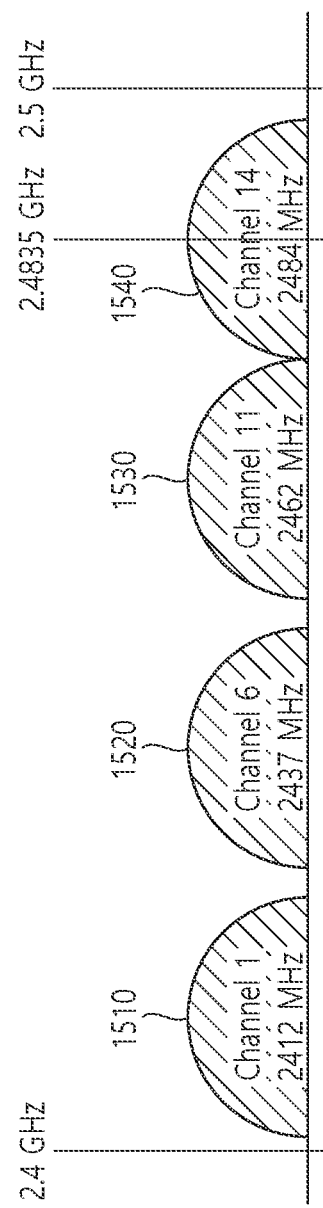
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
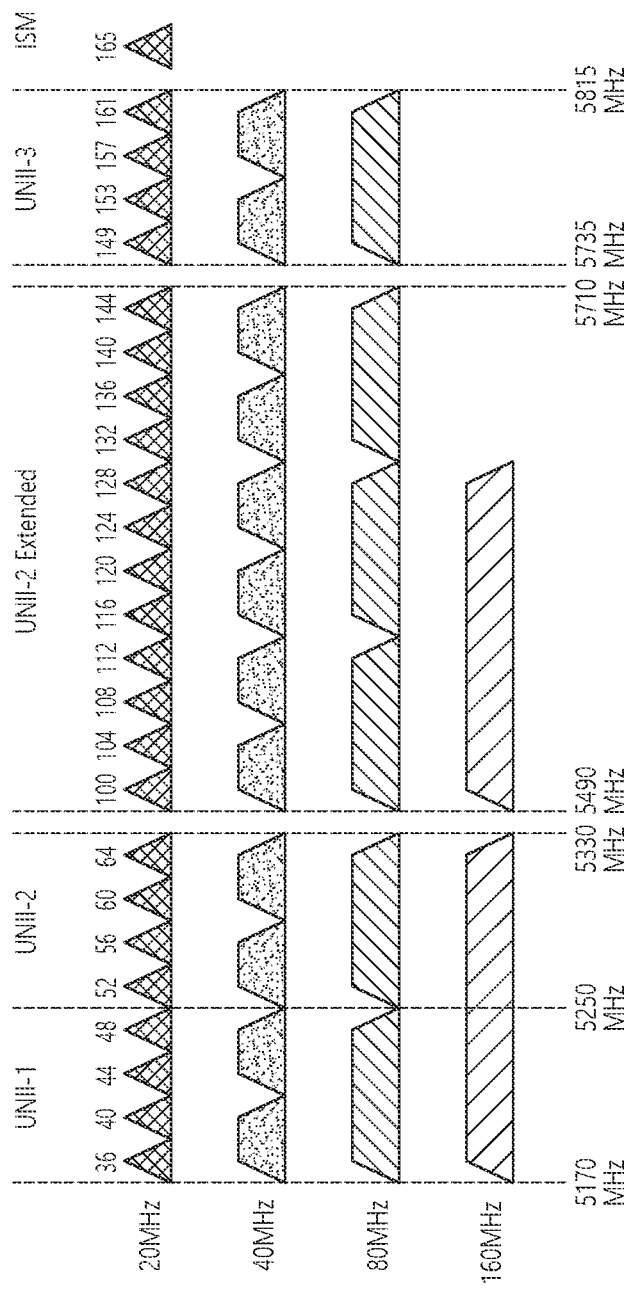
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
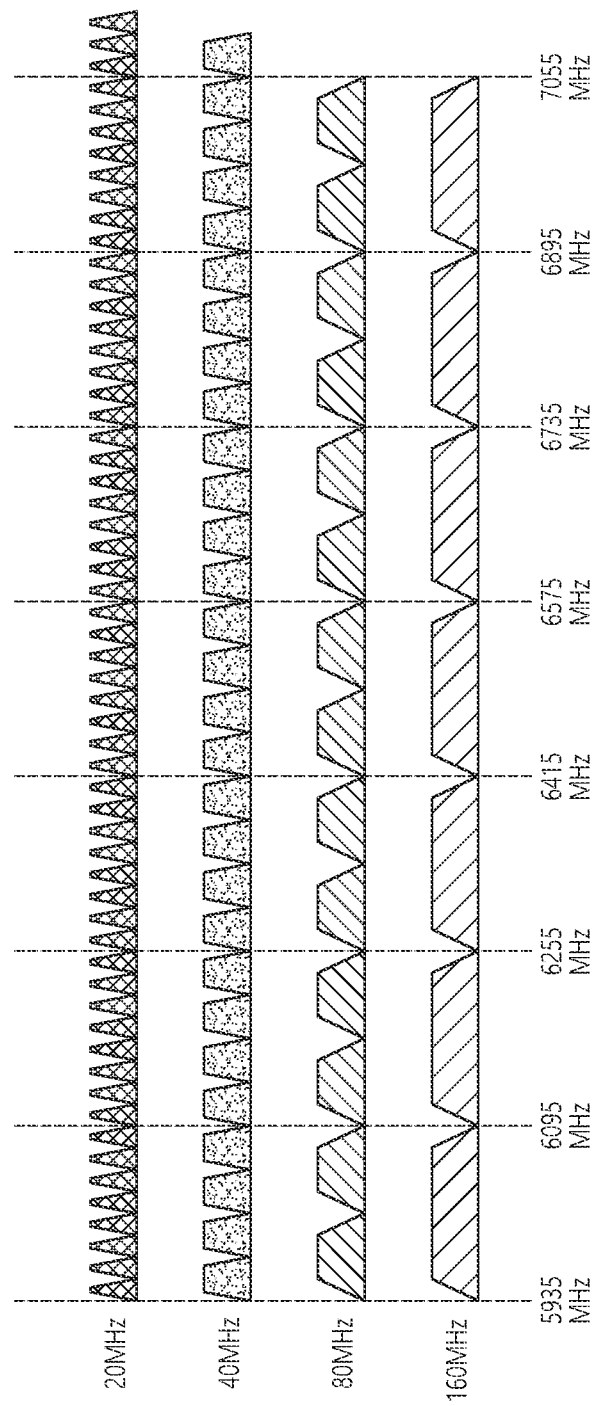
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 us. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information on whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 us may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 us may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 us, and a periodicity signal of 3.2 us may be repeated 5 times to become a second type STF having a length of 16 us. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
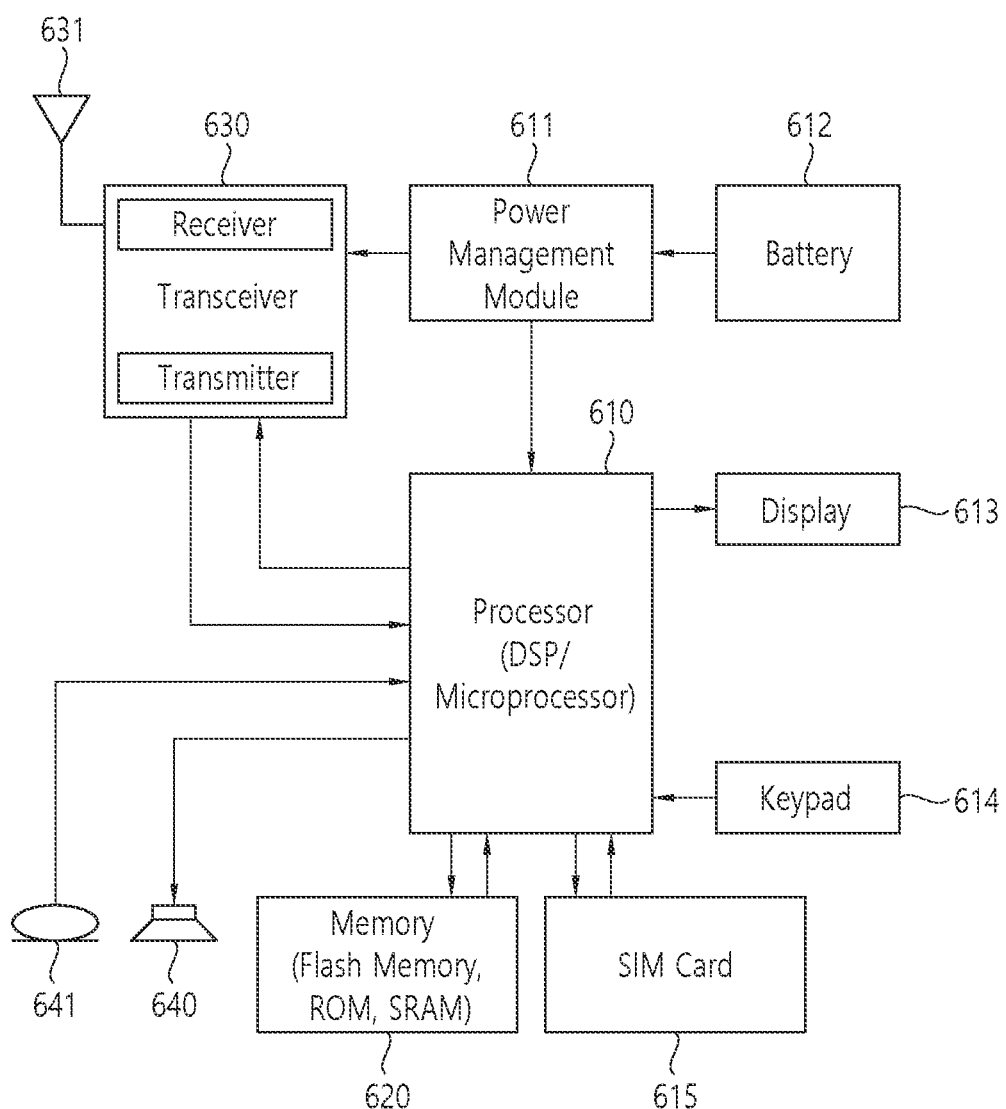
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
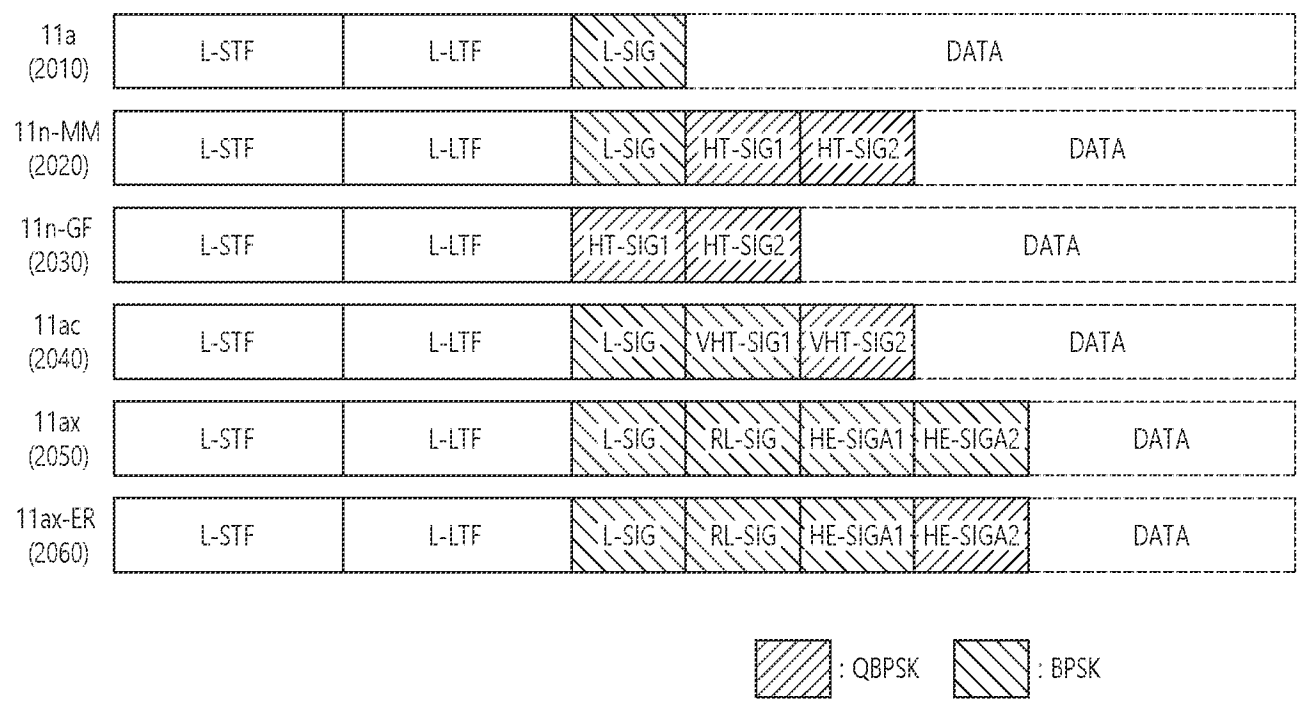

FIG. 20 shows an example of various types of PPDUs.

As shown in FIG. 20, examples of the type (i.e., format) of the PPDU used in the WLAN system include non-HT, HT, VHT, HE PPDU, and the like. Specifically, the illustrated first type PPDU 2010 is a non-HT PPDU defined in the IEEE 802.11a standard, and the illustrated second type PPDU 2020 and the third type PPDU 2030 are an HT PPDU defined in the IEEE 802.11n standard. In addition, the illustrated fourth type PPDU 2040 is a VHT PPDU defined in the IEEE 802.11ac standard, and the illustrated fifth type PPDU 2050 and the sixth type PPDU 2060 are HE PPDUs defined in the IEEE 802.11ax standard.

All types of PPDUs 2010, 2020, 2030, 2040, 2050, and 2060 shown in FIG. 20 may include L-STF and L-LTF fields. Each of the L-STF and L-LTF fields may be transmitted over two symbols (e.g., OFDM symbols). That is, each of the L-STF and L-LTF fields may have a transmission time of 8 μs.

All types of PPDUs 2010, 2020, 2030, 2040, 2050, and 2060 shown in FIG. 20 may include an L-SIG field or an HT-SIG1 field being continuous to the L-LTF field. The L-SIG field or the HT-SIG1 field shown in FIG. 20 may be transmitted through one symbol.

As shown in FIG. 20, the HT-SIG1 field of the third type PPDU 2030 may be modulated based on a quadrature binary phase shift keying (QBPSK) constellation. The QBPSK constellation may be a constellation rotated by 90 degrees counterclockwise based on the BPSK constellation.

Figure 21:
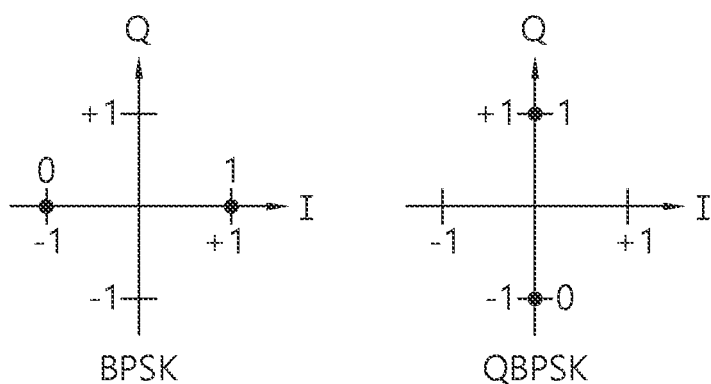
FIG. 21 is a diagram for distinguishing between BPSK and QBPSK.

FIG. 21 is a diagram for distinguishing between BPSK and QBPSK. As shown, the QBPSK constellation may be a constellation rotated by 90 degrees counterclockwise based on the BPSK constellation.

Since QBPSK is applied to the HT-SIG1 field of the third type PPDU 2030 of FIG. 20, the receiving STA can identify that the received PPDU is a third type PPDU when QBPSK is applied to symbols received after the L-LTF field. In addition, when BPSK is applied to symbols received after the L-LTF field, the receiving STA may identify that the received PPDU is any one of the first, second, fourth, fifth, and sixth types of PPDUs.

The fifth and sixth types of PPDUs may be identified/detected by the receiving STA based on the following example. The fifth and sixth types of PPDUs may include a repeated L-SIG (RL-SIG) in which the L-SIG field is repeated. The RL-SIG is contiguous to the L-SIG field. Also, in the fifth and sixth types of PPDUs, three SIG fields should be present after the L-SIG field. The receiving STA may identify that the received PPDU is the fifth and sixth type PPDU when the L-SIG is repeated in the symbol being consecutive to the L-SIG field and there are three SIG fields after the L-SIG field.

In the fifth type PPDU 2050, the BPSK can be applied to the third SIG field after the L-SIG field. Also, in the sixth type PPDU 2060, the QBPSK can be applied to the third SIG field after the L-SIG field. Accordingly, the receiving STA may distinguish the fifth and sixth types of PPDUs from each other based on whether the constellation applied to the third SIG field after the L-SIG field is BPSK or QPBSK.

In addition, in the fourth type PPDU, the L-SIG is not repeated in the field being continuous to the L-SIG field, the BPSK is applied to the first symbol being consecutive to the L-SIG, and the QBPSK is applied to the second symbol being consecutive to the first symbol. Accordingly, the receiving STA may identify the fourth type PPDU based on whether the QBPSK is applied to the second symbol (and/or whether the L-SIG field is repeated).

In addition, since the QBPSK is applied to two symbols being consecutive to the L-SIG for the second type PPDU, the receiving STA can identify/detect the second type PPDU from other types of PPDUs. In addition, as described above, since all PPDUs of second type to sixth type have distinguishable characteristics, if PPDUs not identified/detected as PPDUs of the second type to the sixth type can be identified/detected as a PPDU having the first type.

The specific order of the above-described identification/detection method may be changed. That is, when the number/constellation of symbols after L-LTF is uniquely configured as shown in FIG. 20, the receiving STA can accurately identify the type of the received PPDU through various methods.

Figure 22:
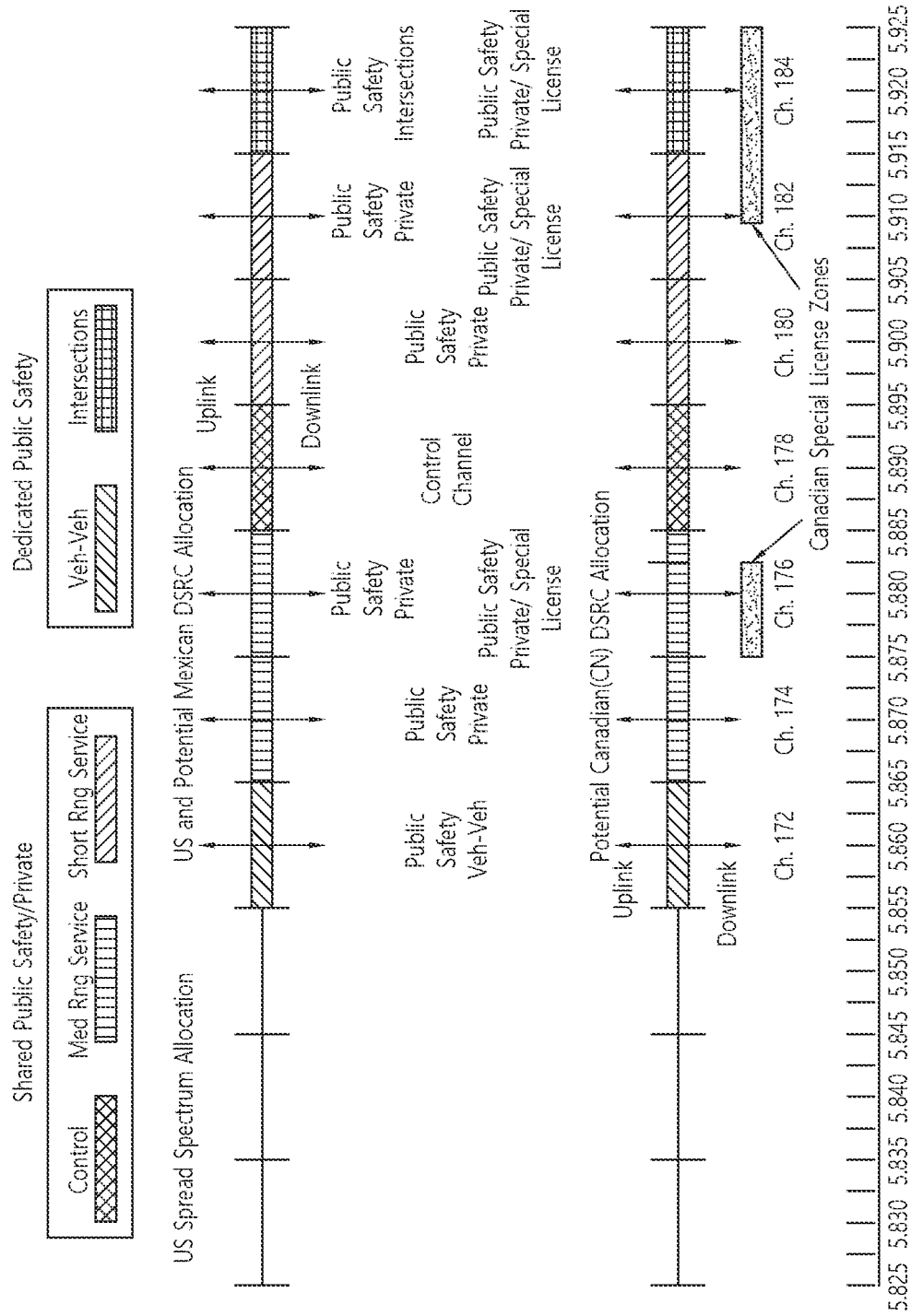
FIG. 22 shows a band plan of 5.9 GHz DSRC.

FIG. 22 shows a band plan of 5.9 GHz DSRC.

The 5.9 GHz DSRC is a short-to-medium-range communication service that supports both public safety and private operations in roadside vehicle and vehicle-to-vehicle communication environments. The DSRC is intended to complement cellular communication by providing very high data rates in situations where it is important to minimize the latency of the communication link and separate relatively small communication areas. Further, the PHY and MAC protocols are based on the IEEE 802.11p amendments for wireless access in the vehicle environment (WAVE).

<IEEE 802.11p>

The 802.11p technology uses 802.11a's PHY with 2× down clocking. That is, the signal is transmitted using 10 MHz bandwidth instead of 20 MHz bandwidth. The numerology comparing 802.11a and 802.11p is as follows.

TABLE 5

|  | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4.5, 6, 9, 12, 18, 24, 27 Mbps |
| Frequency band | 5 GHz ISM | 5.9 GHz dedicated |

The DSRC band includes a control channel and a service channel, and data transmissions of 3, 4.5, 6, 9, 12, 18, 24, and 27 Mbps are available through each of the channels. In the case that the DSRC band includes an optional channel of 20 MHz, transmissions of 6, 9, 12, 18, 24, 36, 48, and 54 Mbps are available. Transmissions of 6, 9, 12 Mbps need to be supported for all services and channels. In the case of the control channel, a preamble has 3 Mbps, but a message itself has 6 Mbps. Channels 174 and 176 and channels 180 and 182 become channels 175 and 181 of 20 MHz, respectively, in the case that the channels are approved by a frequency regulation organization. The remainder is left for future use. Through the control channel, a short message, an alarm data, and a public safety warning data are broadcasted to all OBUs (On Board Units). The reason for separation of the control from the service channel is for efficiency, and to maximize a service quality and to reduce interference between service.

Channel 178 is the control channel, and all OBUs automatically search the control channel and receive an alarm, a data transmission, and a warning message from an RSU (Road Side Unit). All data of the control channel need to be transmitted within 200 ms and are repeated in a predefined period. In the control channel, the public safety data is prior to all private messages. The private message greater than 200 ms is transmitted through the service channel.

Through the service channel, a private message or a long public safety message is transmitted. To prevent a collision, the technique of detecting a channel state before a transmission (Carrier Sense Multiple Access: CSMA) is used.

Figure 23:
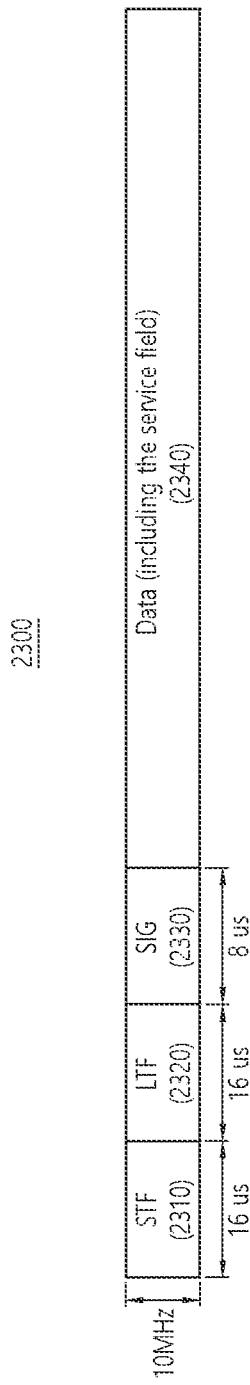
FIG. 23 shows a frame format of a frame according to the 802.11p standard.

FIG. 23 shows a frame format of a frame according to the 802.11p standard.

Referring to FIG. 23, a frame (or packet) according to the 802.11p standard (hereinafter, an 11p frame 2300) may support inter-vehicle communication in a 5.9 GHz band. The 11p frame 2300 may include an STF 2310 for sync and Automatic Gain Control (AGC), an LTF 2300 for channel estimation, and/or a signal field (or SIG field) 2330 including information related to the data field 2340. The data field 2340 may be configured including 16 bits constituting the service field.

The 11p frame 2300 may be configured by applying the same OFDM numerology as the 802.11a standard for a 10 MHz bandwidth. For example, the 802.11p standard can be applied by 2× down clocking OFDM numerology for a 20 MHz bandwidth according to the 802.11a standard. Accordingly, the symbol of the 11p frame 2300 may be set longer than the symbol of the frame according to the 802.11a standard. The symbol of the 11p frame 2300 may have a symbol duration of 8 μs. The 11p frame 2300 may have a length twice that of a frame according to the 802.11a standard in terms of time.

Figure 24:
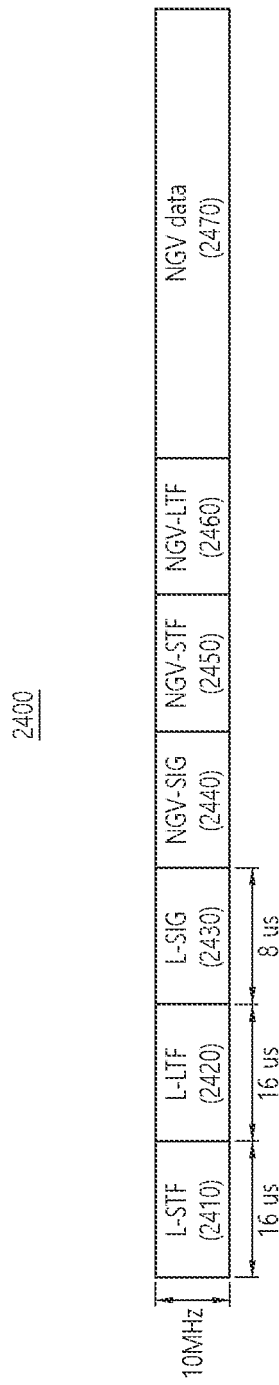
FIGS. 24 to 26 show an embodiment of a PPDU format.

FIG. 24 shows an embodiment of a PPDU format.

Referring to FIG. 24, the PPDU 2400 may be configured in a 10 MHz bandwidth. For example, the PPDU 2400 may be a frame being configured based on the IEEE802.11bd standard. For backward compatibility and/or interoperability with the IEEE802.11p standard using the 5.9 GHz band, the PPDU 2400 may include a preamble part of the IEEE802.11p frame. For example, the PPDU 2400 may include an L-STF 2410, an L-LTF 2420, or an L-SIG (or L-SIG field) 2430. Following the L-SIG 2430, the PPDU 2400 may include NGV-SIG (or NGV-SIG field) 2440, NGV-STF 2450, NGV-LTF 2460, and NGV Data (or NGV-Data field) including control information for NGV 2470.

The NGV-SIG 2440 may be related to transmission information. For example, the NGV-SIG 2440 may include transmission information. For example, the NGV-SIG 2440 may include information related to bandwidth, MCS, Nss, Midamble periodicity, LDPC Extra symbol, LTF format, or tail bit. BCC encoding with a coding rate of 1/2 may be applied to the NGV-SIG 2440.

The NGV-STF 2450 may be configured by 2× downclocking a 20 MHz VHT-STF being configured based on the IEEE802.11ac standard. The NGV-LTF 2460 may be configured by 2× downclocking a 20 MHz VHT-LTF being configured based on the IEEE802.11ac standard. When only a single stream is supported, since automatic gain control (AGC) does not need to be performed, the NGV-STF 2450 may be omitted.

Figure 25:
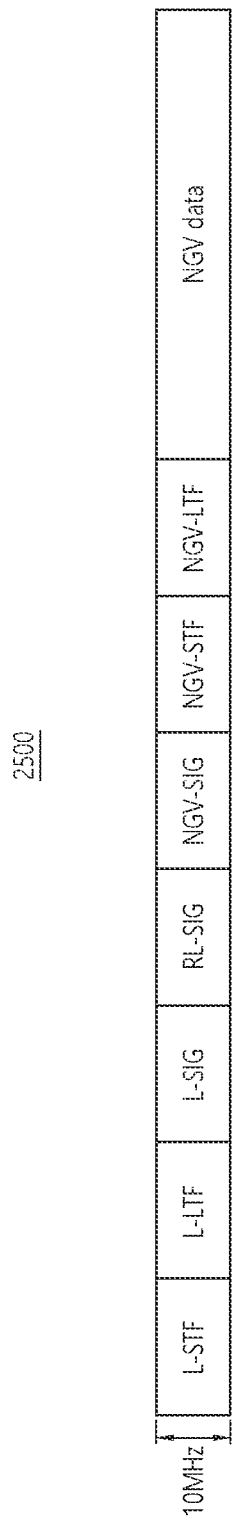
Figure 26:
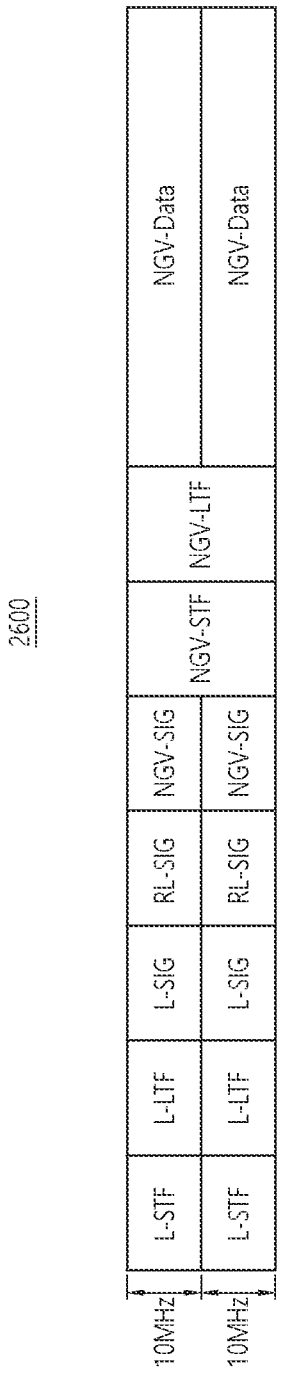

FIGS. 25 and 26 are diagrams illustrating an embodiment of a PPDU format.

As shown in FIGS. 25 and 26, PPDUs 2500 and 2600 may include L-STF, L-LTF, L-SIG, RL-SIG, NGV-STF, NGV-LTF, and NGV-data fields. For example, the PPDUs 2500 and 2600 may be 11bd frames supporting IEEE802.11bd.

The PPDU 2500 of FIG. 25 may be configured for a 10 MHz bandwidth. The PPDU 2600 of FIG. 26 may be configured for a 20 MHz bandwidth. The PPDUs 2500 and 2600 may be configured to operate in a 5.9 GHz Intelligent Transportation Systems (ITS) band to be interoperable with the IEEE802.11p standard.

A device (or an apparatus) supporting the IEEE802.11bd standard (hereinafter referred to as an 11bd device) may determine whether there is a device supporting the IEEE802.11p standard (hereinafter referred to as an 11p device) in the vicinity through preamble detection, probe request/response, or transmission/reception of a CTS/RTS signal. An 11bd device may transmit an 11bd frame (or an 11bd PPDU) when there is no 11p device nearby. In other words, the 11bd device may transmit an 11bd frame (or an 11bd PPDU) based on the presence or absence of an 11p device around the 11bd device. The 11bd device may transmit the PPDUs 2500 and 2600 shown in FIGS. 25 and/or 26 in order to reduce the effect on the hidden node.

The PPDUs 2500 and 2600 may include an RL-SIG contiguous to the L-SIG for robust transmission. The RL-SIG can be a repeated field of the L-SIG, and it can be the same field as the L-SIG. The RL-SIG can be continuous to the L-SIG in the time domain.

The NGV-LTF can be configured based on at least one LTF format. For example, NGV-LTF can be configured based on one of NGV-LTF-1× format, NGV-LTF-2× format, or repeated NGV-LTF-2× format. Information related to the LTF format used for the NGV-LTF can be included in the NGV-SIG.

For example, the NGV-LTF-2× format may be set as the default format. As another example, the NGV-LTF-1× format may be used for high-efficiency transmission of one spatial stream. As yet another example, the repeated NGV-LTF-2× format may be used for extended range transmissions. The repeated NGV-LTF-2× format may be configured by repeating the NGV-LTF-2× format from which 1.6 μs of one pre-appended cyclic prefix (CP) and guard interval (GI) are excluded. The repeated NGV-LTF-2× format may be used when dual carrier modulation (DCM) and BPSK modulation are applied to the NGV data. For example, when the DCM and BPSK modulation are applied to the NGV data, regardless of the information related to the LTF format included in the NGV-SIG, the repeated NGV-LTF-2× format may be used in/applied to the NGV-LTF.

For example, in the 10 MHz transmission, a sequence of the NGV-LTF-1× format may be configured as shown below in Equation 1.

$$NGV\text{-}LTF\text{-}1\times \text{ sequence} = \{1,0,1,0,-1,0,1,0,-1,0,-1,0,1,\\ 0,1,0,1,0,-1,0,1,0,1,0,1,0,1,0,0,0,-1,0,1,0,-1,0,-\\ 1,0,-1,0,-1,0,-1,0,1,0,-1,0,-1,0,-1,0,1,0,1,0,-1\} \quad \text{[Equation 1]}$$

For example, in the 10 MHz transmission, a sequence of the NGV-LTF-2× format may be configured as shown below in Equation 2.

$$NGV\text{-}LTF\text{-}2\times \text{ sequence} = \{1,1,LTF_{left},0,LTF_{right},-1,-1\} \quad \text{[Equation 2]}$$

Referring to Equation 2, LTF_left and LTF_right may be configured as shown below in Equation 3.

$$LTF_{left} = \{1,1,-1,-1,1,1,-1,1,-1,1,1,1,1,1,1,-1,-1,1,1,-1,1,1,1,1,1\}$$

$$LTF_{right} = \{1,-1,-1,1,1,-1,1,-1,1,-1,-1,-1,-1,-1,1,1,1,-1,1,1,-1,-1,1,1,1,1,1,\} \quad \text{[Equation 3]}$$

For example, in the 20 MHz transmission, a sequence of the NGV-LTF-1× format may be set as shown in Equation (4).

$$NGV\text{-}LTF\text{-}1\times \text{ sequence} = \{1,0,-1,0,1,0,-1,0,-1,0,1,0,1,\\ 0,1,0,-1,0,1,0,1,0,1,0,1,0,1,0,-1,0,-1,0,-1,0,-1,\\ 0,-1,0,-1,0,-1,0,1,0,-1,0,-1,0,-1,0,1,0,1,0,-1,0,\\ 1,0,0,0,-1,0,1,0,1,0,-1,0,1,0,-1,0,-1,0,1,0,1,0,1,\\ 0,-1,0,1,0,1,0,1,0,1,0,-1,0,1,0,-1,0,-1,0,-1,\\ 0,-1,0,-1,0,1,0,-1,0,-1,0,-1,0,1,0,1\} \quad \text{[Equation 4]}$$

For example, in the 20 MHz transmission, a sequence of the NGV-LTF-2× format may be set as in Equation 5.

$$NGV\text{-}LTF\text{-}2\times \text{ sequence} = \{LTF_{left},1,LTF_{right},-1,-1,-,1,\\ 0,0,0,-1,1,1,-1,LTF_{left},1,LTF_{right}\} \quad \text{[Equation 5]}$$

In Equation 5, LTF_left and LTF_right may refer to Equation 3.

NGV data may include a service field, PHY pad bits, and/or PSDU.

The NGV-SIG may be transmitted in the following method for robust transmission.

Figure 27:
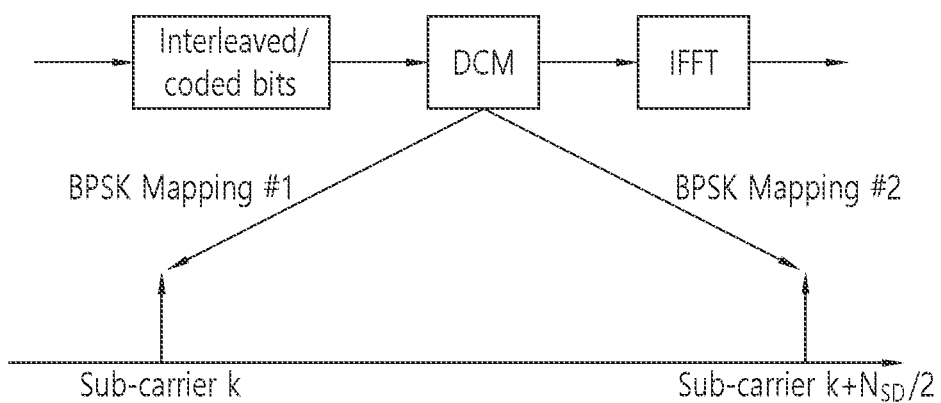
FIG. 27 is a diagram illustrating an example of DCM.

For example, for robust transmission of the NGV-SIG, dual carrier modulation (DCM) may be applied to the NGV-SIG. For example, a same symbol to be modulated in the frequency domain may be repeatedly mapped to subcarriers with different constellation mapping schemes. FIG. 27 is a diagram illustrating an example of the DCM. Referring to FIG. 27, the same (original) signal may be mapped to different subcarriers based on the DCM.

For example, for robust transmission of the NGV-SIG, the NGV-SIG signal may be transmitted based on 2-tone intervals in the frequency domain without using the DCM. For example, a tone carrying a signal and a null tone not carrying a signal may be alternately mapped. When the signal of NGV-SIG is transmitted at 2-tone intervals, two repeated time sequences can be generated in one symbol. Thus, the NGV-SIG can be transmitted robustly.

The receiving STA may receive the NGV-SIG, and may improve reception performance by combining the repeated NGV-SIG in the frequency/time domain.

The NGV-SIG can use the same number of available tones as the L-SIG. That is, the NGV-SIG may be transmitted through 48 subcarriers. When the NGV-SIG is transmitted through 48 subcarriers (e.g., excluding 4 pilots from 52 available subcarriers), the NGV-SIG field may be configured as shown in Table 6.

TABLE 6

| Contents | Bits |
|---|---|
| BW | 1 bit |
| MCS | 4 bit |

TABLE 6-continued

| Contents | Bits |
| --- | --- |
| Tail bit | 6 bit |
| Parity bit | 1 bit |
| Total | 12 bit |

For example, the NGV-SIG field may include 12-bit information including a bandwidth (BW) field, a modulation and coding scheme (MCS) field, a tail bit field, and a parity bit field. The BW field may have a size of 1 bit, the MCS field may have a size of 4 bits, the Tail Bit field may have a size of 6 bits, and the Parity bit field may have a size of 1 bit. The MCS field may include information related to modulation and information related to a code rate. The MCS field may not include information related to a type of channel coding (e.g., low density parity check (LDPC) and/or binary convolutional coding (BCC)).

To transmit more information in the NGV-SIG field, four extra tones of L-SIG and RL-SIG may be used. The four extra tones in each of the L-SIG and RL-SIG may be used for channel estimation. If four extra tones in each of the L-SIG and RL-SIG are used, four extra tones of NGV-SIG field may also be used. For example, the four extra tones of the NGV-SIG may include control information. For example, the frame structure in the case where the four extra tones are used may be as shown in FIG. 28.

Figure 28:
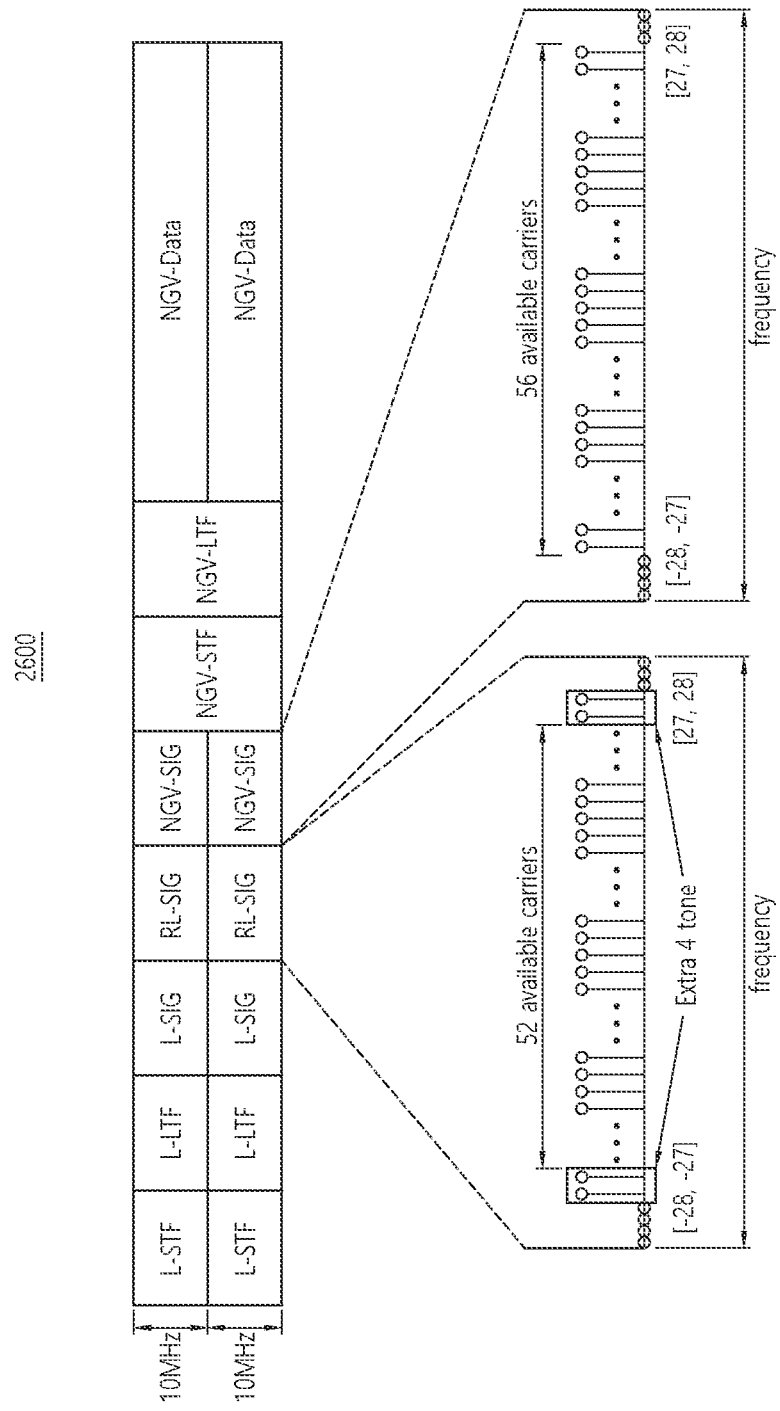
FIG. 28 shows an example which four extra tones are used in a frame structure.

Referring to FIG. 28, the NGV-SIG may further include 2-bit information. That is, the NGV-SIG may be transmitted using four more subcarriers. For example, four extra tones (e.g., subcarrier indices 27, 28, −27, −28) may be further used. For example, in general, 48 subcarriers (i.e., excluding 4 pilot subcarriers from a total of 52 available subcarriers ranging from subcarrier index −26 to subcarrier index 26) may be used. For example, if the four extra tones are used, 52 subcarriers excluding the 4 pilot subcarriers from a total of 56 available subcarriers (i.e., ranging from subcarrier index −28 to subcarrier index 28) may be used. If the NGV-SIG is configured based on the DCM or the method of transmitting a signal at 2-tone intervals described above, the NGV-SIG may include 1 additional bit compared to the 12 bits shown in Table 6. When using the four extra tones, the NGV-SIG may be configured as shown in Table 7 to Table 10.

TABLE 7

| Contents | Bits |
| --- | --- |
| BW | 1 bit |
| MCS | 4 bit |
| LTF type | 1 bit |
| Parity bit | 1 bit |
| Tail bit | 6 bit |
| Total | 13 bit |

TABLE 8

| Contents | Bits |
| --- | --- |
| BW | 1 bit |
| MCS | 4 bit |
| Midamble period | 1 bit |

TABLE 8-continued

| Contents | Bits |
| --- | --- |
| Parity bit | 1 bit |
| Tail bit | 6 bit |
| Total | 13 bit |

TABLE 9

| Contents | Bits |
| --- | --- |
| BW | 1 bit |
| MCS | 4 bit |
| Tail bit | 6 bit |
| CRC | 2 bit |
| Total | 13 bit |

TABLE 10

| Contents | Bits |
| --- | --- |
| BW | 1 bit |
| MCS | 4 bit |
| Reserved bit | 1 bit |
| Parity bit | 1 bit |
| Tail bit | 6 bit |
| Total | 13 bit |

Referring to Table 7, the NGV-SIG may include BW, the MCS, LTF type (type), Parity bit, and Tail bit fields. The BW field may include 1-bit information, the MCS field may include 4-bit information, the LTF type field may include 1-bit information, the Parity bit field may include 1-bit information, the Tail bit field may include 6-bit information, and the NGV-SIG may include 13-bit information.

Referring to Table 8, the NGV-SIG may include the BW, MCS, midamble period, Parity bit, and Tail bit fields. The BW field may include 1-bit information, the MCS field may include 4-bit information, the midamble period field may include 1-bit information, the Parity bit field may include 1-bit information, the Tail bit field may include 6-bit information, and the NGV-SIG may include 13-bit information. The midamble may denote a channel estimation field (e.g., LTF) inserted in the middle of the data field.

Referring to Table 9, the NGV-SIG may include the BW, MCS, Tail bit, and CRC fields. The BW field may include 1-bit information, the MCS field may include 4-bit information, the Tail bit field may include 6-bit information, and the CRC field may include 2-bit information, and the NGV-SIG may include 13-bit information. The midamble may denote a channel estimation field (e.g., LTF) inserted in the middle of the data field. In order to increase reliability of the control field (i.e., the NGV-SIG field), the NGV-SIG may include a 2-bit CRC field instead of a 1-bit Parity bit field.

Referring to Table 10, the NGV-SIG may include the BW, MCS, reserved field (or reserved bit), parity bit, and tail bit fields. The BW field may include 1-bit information, the MCS field may include 4-bit information, the spare field may include 1-bit information, the Parity bit field may include 1-bit information, the Tail bit field may include 6-bit information, and the NGV-SIG may include 13-bit information. A SIG field with 1 bit reserved for future extension can be configured. For example, the 1 bit may be reserved for a spare field in consideration of further extension of the SIG field.

Figure 29:
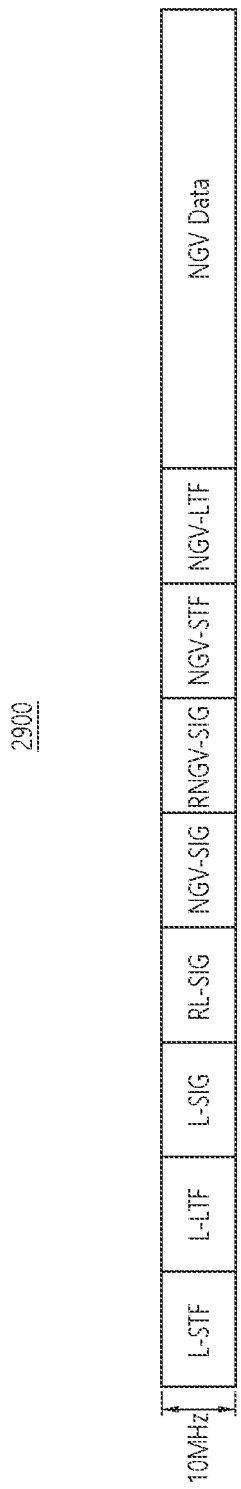

FIGS. 29 and 30 are diagrams illustrating an embodiment of a PPDU format.

Referring to FIGS. 29 and 30, the NGV-SIG field can be 24-bit information or 26-bit information. For example, when four extra tones are used, the NGV-SIG may include information having a length of 26 bits. When the extra 4 tones are not used, the NGV-SIG may include information having a length of 24 bits. The NGV-SIG field may include control information required to interpret the NGV PPDU.

The PPDU 2900 of FIG. 29 may be configured for a 10 MHz bandwidth. The PPDU 3000 of FIG. 30 may be configured for a 20 MHz bandwidth. The PPDU may be configured to operate in a 5.9 GHz Intelligent Transportation Systems (ITS) band to be interoperable with the IEEE802.11p standard.

The NGV-SIG field may include a 1-bit BW field. For example, the BW field may include 1-bit information related to whether the bandwidth is 10 MHz or 20 MHz.

The NGV-SIG field may include a 4-bit MCS field. For example, the MCS field may include information related to modulation and information related to a code rate. For example, the MCS field may not include information related to a type of channel coding (e.g., low density parity check (LDPC) and/or binary convolutional coding (BCC)). For example, code rate information included in the MCS field may or may not include whether the DCM is applied.

The NGV-SIG field may include a 1-bit LTF size field. The LTF size field may be a field related to NGV-LTF. For example, the LTF size field may include information related to whether the NGV-LTF is configured based on the NGV-LTF-2× format or the NGV-LTF-1× format.

The NGV-SIG field may include a 1-bit midamble periodicity field. The midamble period field may include information related to how many symbols the midamble is repeated/inserted.

The NGV-SIG field may include a 1-bit coding field. The coding field may include information related to whether the BCC scheme or the LDPC scheme is used for channel coding.

The NGV-SIG field may include an LDPC extra symbol field having a length of 1 bit.

The NGV-SIG field may include a spatial-time-stream (NSTS) field having a length of 1 bit. For example, the NSTS field may include information related to an NSTS or a number of spatial stream (NSS). That is, the NSTS field may include information related to the number of streams.

The NGV-SIG field may include a 1-bit STBC field, a 1-bit DCM field, a 4-bit CRC field, and a 6-bit tail bit field.

In addition, the NGV-SIG field may include a field including other information. The NGV-SIG field may include all or part of the fields described above.

The PPDUs 2900 and 3000 may include the L-STF, L-LTF, L-SIG, RL-SIG, NGV-SIG, RNGV-SIG, NGV-STF, NGV-LTF, and NGV-data. The L-LTF may be contiguous to L-STF, the L-SIG may be contiguous to the L-SIG, the RL-SIG may be contiguous to the L-SIG, and the NGV-SIG may be contiguous to the RL-SIG, the RNGV-SIG may be contiguous to the NGV-SIG, the NGV-STF may be contiguous to the RNGV-SIG, the NGV-LTF may be contiguous to the NGV-STF, and the NGV-data may be contiguous to the NGV-LTF.

The PPDUs 2900 and 3000 may include an RL-SIG being contiguous to the L-SIG for robust transmission. The RL-SIG can be a repeated field of the L-SIG, and may be the same field as the L-SIG. The RL-SIG can be continuous to the L-SIG in the time domain. The L-SIG and RL-SIG may include control information.

The NGV-SIG may be configured as one symbol (8 μs). For robust transmission and/or range extension transmission, the NGV-SIG symbol may be repeatedly transmitted once more (i.e., the RNGV-SIG symbol is transmitted). Alternatively, for example, the DCM may be applied to NGV-SIG to transmit two symbols.

The RNGV-SIG is a repeated field of the NGV-SIG, and may be the same field as the NGV-SIG. The RNGV-SIG can be continuous to the NGV-SIG in the time domain.

For example, the same encoding, interleaving, and modulation can be applied to both the NGV-SIG and the RNGV-SIG. That is, the RNGV-SIG may be configured in the same manner as the NGV-SIG. That is, in the RNGV-SIG, the same field as the NGV-SIG may be repeated.

For example, the RNGV-SIG may have the same encoding and modulation applied to the NGV-SIG, but may bypass the interleaver. That is, in the RNGV-SIG, modulation may be performed without using an interleaver after encoding.

The NGV-SIG may be repeated in units of symbols. That is, after the NGV-SIG symbol is transmitted, the RNGV-SIG symbol may be transmitted. Accordingly, the receiving STA may perform decoding of the NGV-SIG and the RNGV-SIG in units of symbols. The receiving STA may improve the performance of the NGV-SIG through aggregation using the NGV SIG and the RNGV-SIG (e.g., repeated NGV-SIG). As a result, the effect of the range extension can be obtained. For example, the receiving STA may combine the NGV-SIG and the RNGV-SIG, and may obtain a gain through the repeated reception of the control field.

As in the RL-SIG, the NGV-SIG may not require a separate indication because the same symbol can be repeatedly transmitted. Accordingly, an effect of reducing signaling overhead can be obtained. Since the L-SIG symbol is also repeatedly transmitted and the NGV-SIG symbol is also repeatedly transmitted, consistency can be maintained, thereby facilitating implementation.

Since the NGV-SIG is repeated in the time domain, it is possible to obtain an effect of increasing a gain in an environment in which a channel change is large. The NGV-SIG symbol has a length of 8 μs and may have a GI (guard interval) of 1.6 μs, so that the inter-symbol interference (e.g., delay spread) can be reduced compared to the case where the symbol length is 4 μs with a GI having a 0.8 μs symbol length.

As another example, the encoded NGV-SIG may be divided into two symbols and transmitted by applying DCM. The receiving STA (e.g., NGV device) may perform decoding in units of two symbols when receiving NGV-SIG.

Figure 31:
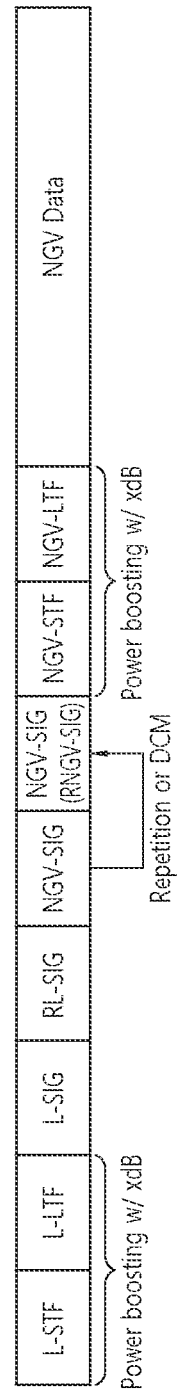
FIG. 31 is a diagram illustrating an embodiment of a PPDU.

FIG. 31 is a diagram illustrating an embodiment of a PPDU.

Referring to FIG. 31, the PPDU may be configured in a 10 MHz bandwidth. For example, the PPDU may be a frame being configured based on the IEEE802.11bd standard. For backward compatibility and/or interoperability with the IEEE802.11p standard using the 5.9 GHz band, the PPDU 2400 may include a preamble part of the IEEE802.11p frame. For example, the PPDU may include L-STF, L-LTF or L-SIG, and RL-SIG. In addition, following the RL-SIG, the PPDU further include NGV-SIG containing control information for NGV, a repeated field of the NGV-SIG (e.g., RNGV-SIG), NGV-STF, NGV-LTF, and NGV Data.

In order to reduce additional signaling overhead when configuring the NGV-SIG for robust transmission and/or range extension, the configuration of the NGV-SIG may be indicated by using the MCS. That is, the MCS may include information related to the configuration of the NGV-SIG.

For example, in the case of 11bd transmission, when MCS is set to MCS0, MCS0 with the DCM, or lower rate than the MCS0, the NGV-SIG may be configured repeatedly or configured with the DCM being applied. For example, the above setting may be applied only when BW is set to 10 MHz. For example, when MCS different from the above or BW is set to 20 MHz, the NGV-SIG is configured by applying the MCS0, and in this case, repetition configuration of NGV-SIG or DCM may not be applied.

For example, a) 11bd PPDU (i.e., NGV PPDU) is configured as an NGV-SIG using the above method in order to satisfy range extension or low sensitivity; or b) when the L-STF and/or L-LTF of the legacy preamble is power boosted, it is possible to apply power boosting to the NGV-STF and the NGV-LTF.

For example, the MCS and/or BW field may include information related to the power boosting for the NGV-STF and/or the NGV-LTF.

For example, if the BW of the NGV PPDU is 10 MHz, and the MCS is set to MCS0 with the DCM being applied, or is set to lower rate than MCS0, the NGV-SIG is repeatedly configured or DCM is applied. The STF and/or the NGV-LTF may be transmitted with the power boosting by a predetermined dB value. The predetermined power boosting value may be one of 1, 2, and 3 dB. For example, a power boosting value applied to NGV-STF and/or NGV-LTF may be the same as a value applied to L-STF and L-LTF.

The MCS0 may denote that BPSK modulation is being applied. For example, when the BPSK modulation is applied to at least one field included in the NGV PPDU, the receiving STA may obtain information related to that the power boosting is being applied to the L-STF and/or L-LTF of the NGV PPDU. For example, when the BPSK modulation is applied to at least one field included in the NGV PPDU, the receiving STA may obtain relevant information indicating that power boosting by 3 dB is being applied to the L-STF and/or L-LTF of the NGV PPDU. For example, if the BPSK modulation is applied to at least one field included in the NGV PPDU, the receiving STA may obtain information related to that the L-STF and/or L-LTF of the NGV PPDU is multiplied by a scaling factor as much as root 2 (i.e., the square root of 2).

For example, when both the BPSK modulation and the DCM are applied to at least one field included in the NGV PPDU, the receiving STA may obtain information related to that power boosting is applied to the L-STF and/or L-LTF of the NGV PPDU. For example, when both the BPSK modulation and the DCM are applied to at least one field included in the NGV PPDU, the receiving STA may obtain information related to that 3 dB of power boosting is applied to the L-STF and/or L-LTF of the NGV PPDU. For example, if the BPSK modulation and the DCM are applied to at least one field included in the NGV PPDU, the receiving STA may obtain information related to that the L-STF and/or L-LTF of the NGV PPDU is multiplied by a scaling factor as much as root 2 (i.e., the square root of 2).

Figure 32:
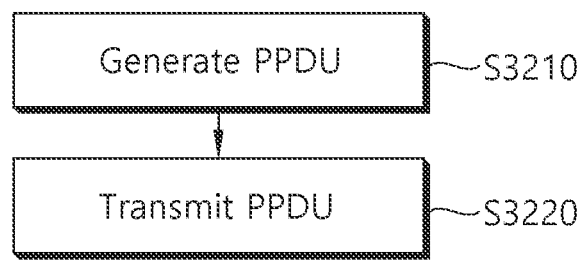
FIG. 32 is a flowchart illustrating an embodiment of an operation of a transmitting station.

FIG. 32 is a flowchart illustrating an embodiment of an operation of a transmitting station (STA).

Referring to FIG. 32, the transmitting STA may generate a PPDU as shown in Step S3210. The PPDU may be an NGV PPDU supporting 11bd. The NGV PPDU may include a first legacy control field (e.g., L-SIG), a second legacy control field in which the first legacy control field is repeated (e.g., RL-SIG), a first NGV control field (e.g., NGV-SIG), a second NGV control field in which the first NGV control field is repeated (e.g., RNGV-SIG), a short training field (NGV-STF), and a long training field (NGV-LTF).

The second legacy control field can be contiguous to the first legacy control field, the first NGV control field can be contiguous to the second legacy control field, the second NGV control field can be contiguous to the first NGV control field, and the NGV-STF can be contiguous to the second NGV control field, and NGV-LTF can be contiguous to the NGV-STF.

The first and second NGV control fields may include control information required to interpret the NGV PPDU. The control information may include 1-bit information related to NGV-LTF (e.g., an LTF size field described below). The first and second NGV control fields may include 24-bit information.

The NGV-SIG field (i.e., the first and second NGV control fields) may include a 1-bit BW field. For example, the BW field may include 1-bit information related to whether the bandwidth is 10 MHz or 20 MHz.

The NGV-SIG field may include a 4-bit MCS field. For example, the MCS field may include information related to modulation and information related to a code rate. For example, the MCS field may not include information related to a type of channel coding (e.g., low density parity check (LDPC) and/or binary convolutional coding (BCC)). For example, code rate information included in the MCS field may or may not include whether the DCM is applied.

The NGV-SIG field may include a 1-bit LTF size field. The LTF size field may be a field related to NGV-LTF. For example, the LTF size field may include information related to whether the NGV-LTF is configured based on the NGV-LTF-2× format or the NGV-LTF-1× format.

The NGV-SIG field may include a 1-bit midamble periodicity field. The midamble period field may include information related to how many symbols the midamble is repeated/inserted.

The NGV-SIG field may include a 1-bit coding field. The coding field may include information related to whether the BCC scheme or the LDPC scheme is used for channel coding.

The NGV-SIG field may include an LDPC extra symbol field having a length of 1 bit.

The NGV-SIG field may include a spatial-time-stream (NSTS) field having a length of 1 bit. For example, the NSTS field may include information related to an NSTS or a number of spatial stream (NSS). That is, the NSTS field may include information related to the number of streams.

The NGV-SIG field may include a 1-bit STBC field, a 1-bit DCM field, a 4-bit CRC field, and a 6-bit tail bit field.

In addition, the NGV-SIG field may include a field including other information. The NGV-SIG field may include all or part of the fields described above.

The PPDU may include an RL-SIG being contiguous to the L-SIG for robust transmission. The RL-SIG can be a repeated field of the L-SIG, and may be the same field as the L-SIG. The RL-SIG can be continuous to the L-SIG in the time domain. The L-SIG and RL-SIG may include control information.

The NGV-SIG may be configured as one symbol (8 μs). For robust transmission and/or range extension transmission, the NGV-SIG symbol may be repeatedly transmitted once more (i.e., the RNGV-SIG symbol is transmitted). Alternatively, for example, the DCM may be applied to NGV-SIG to transmit two symbols.

The RNGV-SIG is a repeated field of the NGV-SIG, and may be the same field as the NGV-SIG. The RNGV-SIG can be continuous to the NGV-SIG in the time domain.

For example, the same encoding, interleaving, and modulation can be applied to both the NGV-SIG and the RNGV- SIG. That is, the RNGV-SIG may be configured in the same manner as the NGV-SIG. That is, in the RNGV-SIG, the same field as the NGV-SIG may be repeated.

The NGV-SIG may be repeated in units of symbols. That is, after the NGV-SIG symbol is transmitted, the RNGV-SIG symbol may be transmitted. Accordingly, the receiving STA may perform decoding of the NGV-SIG and the RNGV-SIG in units of symbols. The receiving STA may improve the performance of the NGV-SIG through aggregation using the NGV SIG and the RNGV-SIG (e.g., repeated NGV-SIG). As a result, the effect of the range extension can be obtained. For example, the receiving STA may combine the NGV-SIG and the RNGV-SIG, and may obtain a gain through the repeated reception of the control field.

As in the RL-SIG, the NGV-SIG may not require a separate indication because the same symbol can be repeatedly transmitted. Accordingly, an effect of reducing signaling overhead can be obtained. Since the L-SIG symbol is also repeatedly transmitted and the NGV-SIG symbol is also repeatedly transmitted, consistency can be maintained, thereby facilitating implementation.

Since the NGV-SIG is repeated in the time domain, it is possible to obtain an effect of increasing a gain in an environment in which a channel change is large. The NGV-SIG symbol has a length of 8 µs and may have a GI (guard interval) of 1.6 µs, so that the inter-symbol interference (e.g., delay spread) can be reduced compared to the case where the symbol length is 4 µs with a GI having a 0.8 µs symbol length.

In order to reduce additional signaling overhead when configuring the NGV-SIG for robust transmission and/or range extension, the configuration of the NGV-SIG may be indicated by using the MCS. That is, the MCS may include information related to the configuration of the NGV-SIG.

For example, in the case of NGV PPDU transmission, when MCS is set to MCS0, MCS0 with the DCM, or lower rate than the MCS0, the NGV-SIG may be configured repeatedly or configured with the DCM being applied. For example, the above setting may be applied only when BW is set to 10 MHz. For example, when MCS different from the above or BW is set to 20 MHz, the NGV-SIG is configured by applying the MCS0, and in this case, repetition configuration of NGV-SIG or DCM may not be applied.

For example, a) 11bd PPDU (i.e., NGV PPDU) is configured as an NGV-SIG using the above method in order to satisfy range extension or low sensitivity; or b) when the L-STF and/or L-LTF of the legacy preamble is power boosted, it is possible to apply power boosting to the NGV-STF and the NGV-LTF.

For example, the MCS and/or BW field may include information related to the power boosting for the NGV-STF and/or the NGV-LTF.

For example, if the BW of the NGV PPDU is 10 MHz, and the MCS is set to MCS0 with the DCM being applied, or is set to lower rate than MCS0, the NGV-SIG is repeatedly configured or DCM is applied. The STF and/or the NGV-LTF may be transmitted with the power boosting by a predetermined dB value. The predetermined power boosting value may be one of 1, 2, and 3 dB. For example, a power boosting value applied to NGV-STF and/or NGV-LTF may be the same as a value applied to L-STF and L-LTF.

The MCS0 may denote that BPSK modulation is being applied. For example, when the BPSK modulation is applied to at least one field included in the NGV PPDU, the receiving STA may obtain information related to that the power boosting is being applied to the L-STF and/or L-LTF of the NGV PPDU. For example, when the BPSK modulation is applied to at least one field included in the NGV PPDU, the receiving STA may obtain relevant information indicating that power boosting by 3 dB is being applied to the L-STF and/or L-LTF of the NGV PPDU. For example, if the BPSK modulation is applied to at least one field included in the NGV PPDU, the receiving STA may obtain information related to that the L-STF and/or L-LTF of the NGV PPDU is multiplied by a scaling factor as much as root 2 (i.e., the square root of 2).

For example, when both the BPSK modulation and the DCM are applied to at least one field included in the NGV PPDU, the receiving STA may obtain information related to that power boosting is applied to the L-STF and/or L-LTF of the NGV PPDU. For example, when both the BPSK modulation and the DCM are applied to at least one field included in the NGV PPDU, the receiving STA may obtain information related to that 3 dB of power boosting is applied to the L-STF and/or L-LTF of the NGV PPDU. For example, if the BPSK modulation and the DCM are applied to at least one field included in the NGV PPDU, the receiving STA may obtain information related to that the L-STF and/or L-LTF of the NGV PPDU is multiplied by a scaling factor as much as root 2 (i.e., the square root of 2).

The transmitting STA may transmit the NGV PPDU (S3220).

Figure 33:
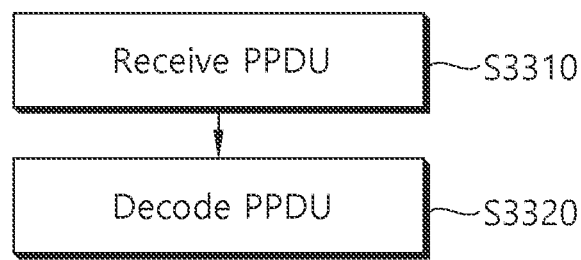
FIG. 33 is a flowchart illustrating an embodiment of an operation of a receiving station.

FIG. 33 is a flowchart illustrating an embodiment of an operation of a receiving station (STA).

Referring to FIG. 33, the receiving STA may receive a PPDU as shown in Step S3310. The PPDU may be an NGV PPDU supporting 11bd. The NGV PPDU may include a first legacy control field (e.g., L-SIG), a second legacy control field in which the first legacy control field is repeated (e.g., RL-SIG), a first NGV control field (e.g., NGV-SIG), a second NGV control field in which the first NGV control field is repeated (e.g., RNGV-SIG), a short training field (NGV-STF), and a long training field (NGV-LTF).

The second legacy control field can be contiguous to the first legacy control field, the first NGV control field can be contiguous to the second legacy control field, the second NGV control field can be contiguous to the first NGV control field, and the NGV-STF can be contiguous to the second NGV control field, and NGV-LTF can be contiguous to the NGV-STF.

The first and second NGV control fields may include control information required to interpret the NGV PPDU. The control information may include 1-bit information related to NGV-LTF (e.g., an LTF size field described below). The first and second NGV control fields may include 24-bit information.

The NGV-SIG field (i.e., the first and second NGV control fields) may include a 1-bit BW field. For example, the BW field may include 1-bit information related to whether the bandwidth is 10 MHz or 20 MHz.

The NGV-SIG field may include a 4-bit MCS field. For example, the MCS field may include information related to modulation and information related to a code rate. For example, the MCS field may not include information related to a type of channel coding (e.g., low density parity check (LDPC) and/or binary convolutional coding (BCC)). For example, code rate information included in the MCS field may or may not include whether the DCM is applied.

The NGV-SIG field may include a 1-bit LTF size field. The LTF size field may be a field related to NGV-LTF. For example, the LTF size field may include information related to whether the NGV-LTF is configured based on the NGV-LTF-2× format or the NGV-LTF-1× format.

The NGV-SIG field may include a 1-bit midamble periodicity field. The midamble period field may include information related to how many symbols the midamble is repeated/inserted.

The NGV-SIG field may include a 1-bit coding field. The coding field may include information related to whether the BCC scheme or the LDPC scheme is used for channel coding.

The NGV-SIG field may include an LDPC extra symbol field having a length of 1 bit.

The NGV-SIG field may include a spatial-time-stream (NSTS) field having a length of 1 bit. For example, the NSTS field may include information related to an NSTS or a number of spatial stream (NSS). That is, the NSTS field may include information related to the number of streams.

The NGV-SIG field may include a 1-bit STBC field, a 1-bit DCM field, a 4-bit CRC field, and a 6-bit tail bit field.

In addition, the NGV-SIG field may include a field including other information. The NGV-SIG field may include all or part of the fields described above.

The PPDU may include an RL-SIG being contiguous to the L-SIG for robust transmission. The RL-SIG can be a repeated field of the L-SIG, and may be the same field as the L-SIG. The RL-SIG can be continuous to the L-SIG in the time domain. The L-SIG and RL-SIG may include control information.

The NGV-SIG may be configured as one symbol (8 µs). For robust transmission and/or range extension transmission, the NGV-SIG symbol may be repeatedly transmitted once more (i.e., the RNGV-SIG symbol is transmitted).

The RNGV-SIG is a repeated field of the NGV-SIG, and may be the same field as the NGV-SIG. The RNGV-SIG can be continuous to the NGV-SIG in the time domain.

For example, the same encoding, interleaving, and modulation can be applied to both the NGV-SIG and the RNGV-SIG. That is, the RNGV-SIG may be configured in the same manner as the NGV-SIG. That is, in the RNGV-SIG, the same field as the NGV-SIG may be repeated.

The NGV-SIG may be repeated in units of symbols. That is, after the NGV-SIG symbol is transmitted, the RNGV-SIG symbol may be transmitted. Accordingly, the receiving STA may perform decoding of the NGV-SIG and the RNGV-SIG in units of symbols. The receiving STA may improve the performance of the NGV-SIG through aggregation using the NGV SIG and the RNGV-SIG (e.g., repeated NGV-SIG). As a result, the effect of the range extension can be obtained. For example, the receiving STA may combine the NGV-SIG and the RNGV-SIG, and may obtain a gain through the repeated reception of the control field.

As in the RL-SIG, the NGV-SIG may not require a separate indication because the same symbol can be repeatedly transmitted. Accordingly, an effect of reducing signaling overhead can be obtained. Since the L-SIG symbol is also repeatedly transmitted and the NGV-SIG symbol is also repeatedly transmitted, consistency can be maintained, thereby facilitating implementation.

Since the NGV-SIG is repeated in the time domain, it is possible to obtain an effect of increasing a gain in an environment in which a channel change is large. The NGV-SIG symbol has a length of 8 µs and may have a GI (guard interval) of 1.6 µs, so that the inter-symbol interference (e.g., delay spread) can be reduced compared to the case where the symbol length is 4 µs with a GI having a 0.8 µs symbol length.

In order to reduce additional signaling overhead when configuring the NGV-SIG for robust transmission and/or range extension, the configuration of the NGV-SIG may be indicated by using the MCS. That is, the MCS may include information related to the configuration of the NGV-SIG.

For example, in the case of NGV PPDU transmission, when MCS is set to MCS0, MCS0 with the DCM, or lower rate than the MCS0, the NGV-SIG may be configured repeatedly or configured with the DCM being applied. For example, the above setting may be applied only when BW is set to 10 MHz. For example, when MCS different from the above or BW is set to 20 MHz, the NGV-SIG is configured by applying the MCS0, and in this case, repetition configuration of NGV-SIG or DCM may not be applied.

For example, a) 11bd PPDU (i.e., NGV PPDU) is configured as an NGV-SIG using the above method in order to satisfy range extension or low sensitivity; or b) when the L-STF and/or L-LTF of the legacy preamble is power boosted, it is possible to apply power boosting to the NGV-STF and the NGV-LTF.

For example, the MCS and/or BW field may include information related to the power boosting for the NGV-STF and/or the NGV-LTF.

For example, if the BW of the NGV PPDU is 10 MHz, and the MCS is set to MCS0 with the DCM being applied, or is set to lower rate than MCS0, the NGV-SIG is repeatedly configured or DCM is applied. The STF and/or the NGV-LTF may be transmitted with the power boosting by a predetermined dB value. The predetermined power boosting value may be one of 1, 2, and 3 dB. For example, a power boosting value applied to NGV-STF and/or NGV-LTF may be the same as a value applied to L-STF and L-LTF.

The MCS0 may denote that BPSK modulation is being applied. For example, when the BPSK modulation is applied to at least one field included in the NGV PPDU, the receiving STA may obtain information related to that the power boosting is being applied to the L-STF and/or L-LTF of the NGV PPDU. That is, by applying BPSK modulation to at least one field included in the NGV PPDU, the transmitting STA may include information related to that the power boosting is being applied to the L-STF and/or L-LTF of the NGV PPDU in the NGV PPDU. For example, the transmitting STA applies the BPSK modulation to at least one field included in the NGV PPDU, so that that information indicating that the L-STF and/or L-LTF of the NGV PPDU is multiplied by a scaling factor as much as root 2 (i.e., the square root of 2) can be included in the NGV PPDU.

For example, when both the BPSK modulation and the DCM are applied to at least one field included in the NGV PPDU, the receiving STA may obtain information related to that power boosting is applied to the L-STF and/or L-LTF of the NGV PPDU. That is, by applying the BPSK modulation and the DCM to at least one field included in the NGV PPDU, the transmitting STA may include information related to that power boosting is applied to the L-STF and/or L-LTF of the NGV PPDU in the NGV PPDU. For example, the transmitting STA may apply the BPSK modulation and the DCM to at least one field included in the NGV PPDU, so that information related to that the L-STF and/or L-LTF of the NGV PPDU is multiplied by a scaling factor as much as root 2 (i.e., the square root of 2) may be included in the NGV PPDU. For example, by applying the BPSK modulation and the DCM to at least one field included in the NGV PPDU, the transmitting STA may include the information related to that the L-STF and/or L-LTF of the NGV PPDU is multiplied by a scaling factor equal to root 2 (i.e., the square root of 2) in the NGV PPDU.

The receiving STA may decode the PPDU (S3320).

Some of the detailed steps shown in the example of FIGS. 32 and 33 may be omitted, and other steps may be added.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, an apparatus herein may include a memory and a processor operatively coupled to the memory, wherein the processor is configured to receive a physical protocol data unit (PPDU) including a first legacy training field, a second legacy training field, a legacy control field, and a next generation vehicular network (NGV) training field, wherein the legacy control field is received through a first symbol, the NGV training field is received through a second symbol being contiguous to the first symbol, the first symbol is modulated based on a first constellation, and the second A symbol may be modulated based on a second constellation rotated based on the first constellation, and information on the type of the PPDU may be obtained based on the first constellation and the second constellation.

The technical features of the present specification may be implemented based on computer readable medium (CRM). For example, the CRM proposed by the present specification is an instruction based on execution by at least one processor of a shared access point (AP) of a wireless local area network system. The instructions perform operation comprising receiving a physical protocol data unit (PPDU) including a first legacy training field, a second legacy training field, a legacy control field, and a next generation vehicular network (NGV) training field, wherein the legacy control field is received through a first symbol, the NGV training field is received through a second symbol being contiguous to the first symbol, the first symbol is modulated based on a first constellation, and the second A symbol may be modulated based on a second constellation rotated based on the first constellation, and information on the type of the PPDU may be obtained based on the first constellation and the second constellation. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 34:
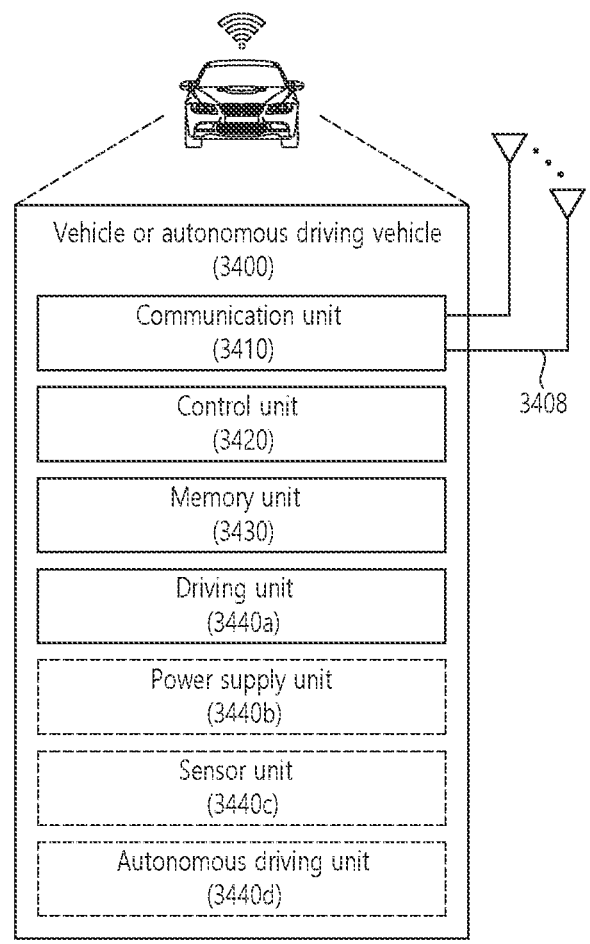
FIG. 34 shows a vehicle or an autonomous driving vehicle applied to the present specification.

FIG. 34 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 3430 shown in FIG. 34 may be included in the memory(s) 112, 122 shown in FIG. 1. Additionally, a communication unit 3410 shown in FIG. 34 may be include in the transceiver(s) 113, 123 and/or processor(s) 111, 121 shown in FIG. 1. Furthermore, the remaining devices that are shown in FIG. 34 may be included in the processor(s) 111, 121 shown in FIG. 1.

Referring to FIG. 34, a vehicle or autonomous driving vehicle 3400 may include an antenna unit 3408, a communication unit 3410, a control unit 3420, a memory unit 3430, a driving unit 3440a, a power supply unit 3440b, a sensor unit 3440c, and/or an autonomous driving unit 3440d. The antenna unit 3408 may be configured as a part of the communication unit 3410.

The communication unit 3410 may transmit and receive signals (e.g., data and control signals) to and from external devices such as other vehicles, BSs (e.g., gNBs and road side units), and servers. The control unit 3420 may perform various operations by controlling elements of the vehicle or the autonomous driving vehicle 3400. The control unit 3420 may include an Electronic Control Unit (ECU). The driving unit 3440a may cause the vehicle or the autonomous driving vehicle 3400 to drive on a road. The driving unit 3440a may include an engine, a motor, a powertrain, a wheel, a brake, a steering device, and so on. The power supply unit 3440b may supply power to the vehicle or the autonomous driving vehicle 3400 and include a wired/wireless charging circuit, a battery, and so on. The sensor unit 3440c may acquire a vehicle state, ambient environment information, user information, and so on. The sensor unit 3440c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 3440d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 3410 may receive map data, traffic information data, and so on, from an external server. The autonomous driving unit 3440d may generate an autonomous driving path and a driving plan from the obtained data. The control unit 3420 may control the driving unit 3440a such that the vehicle or the autonomous driving vehicle 3400 may move along the autonomous driving path according to the driving plan (e.g., speed/direction control). In the middle of autonomous driving, the communication unit 3410 may aperiodically/periodically acquire recent traffic information data from the external server and acquire surrounding traffic information data from neighboring vehicles. In the middle of autonomous driving, the sensor unit 3440c may obtain a vehicle state and/or surrounding environment information. The autonomous driving unit 3440d may update the autonomous driving path and the driving plan based on the newly obtained data/information. The communication unit 3410 may transfer information related to a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 31, which will hereinafter be described in detail.

Figure 35:
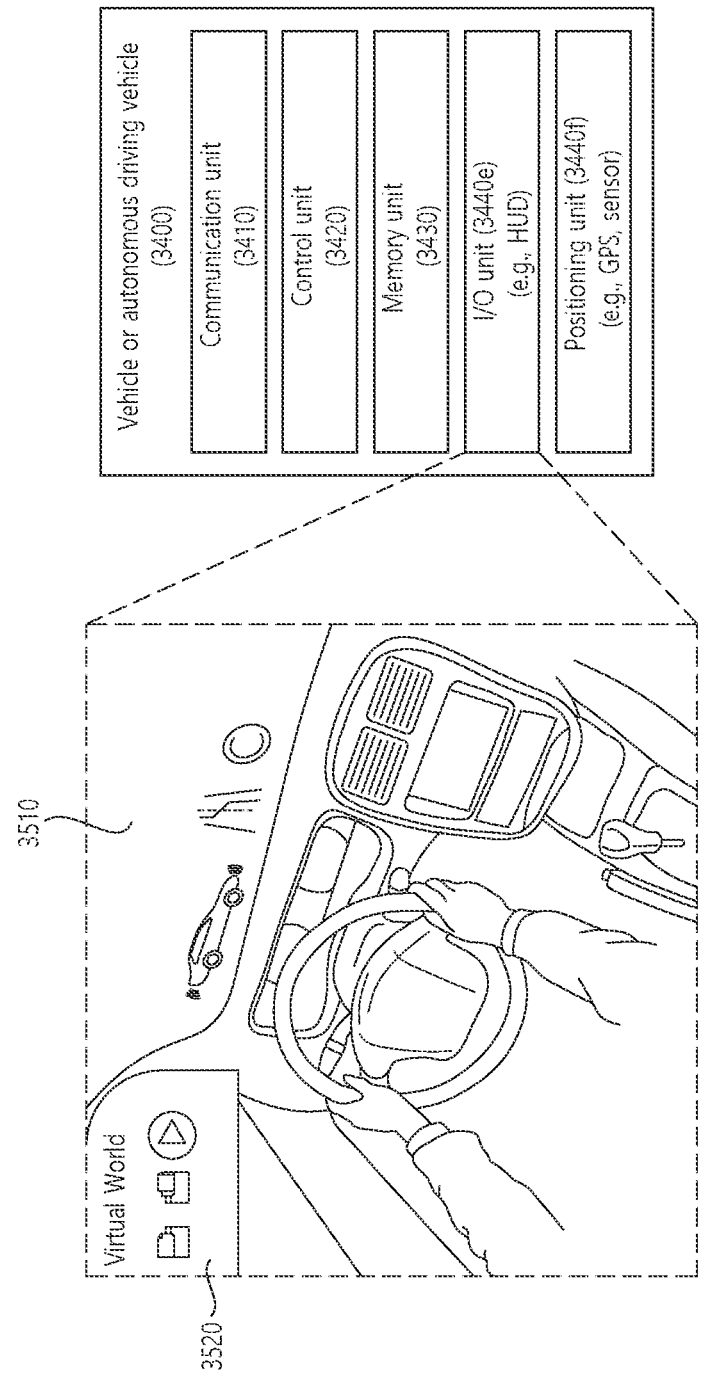
FIG. 35 shows an example of a vehicle that is applied to the present specification.

FIG. 35 shows an example of a vehicle that is applied to the present specification. The vehicle may be implemented as a transport means, an aerial vehicle, a ship, and so on.

Referring to FIG. 35, a vehicle 3400 may include a communication unit 3410, a control unit 3420, a memory unit 3430, an input/output (I/O) unit 3440e, and a positioning unit 3440f. Each block/unit/device shown in FIG. 34 may be the same as each block/unit/device shown in FIG. 31, respectively.

The communication unit 3410 may transmit and receive signals (e.g., data and control signals) to and from external devices such as other vehicles or BSs. The control unit 3420 may perform various operations by controlling constituent elements of the vehicle 3400. The memory unit 3430 may store data/parameters/programs/code/commands for supporting various functions of the vehicle 3400. The I/O unit 3440e may output an AR/VR object based on information within the memory unit 3430. The I/O unit 3440e may include a HUD. The positioning unit 3440f may acquire information related to the position of the vehicle 3400. The position information may include information related to an absolute position of the vehicle 3400, information related to the position of the vehicle 3400 within a traveling lane, acceleration information, and information related to the position of the vehicle 3400 from a neighboring vehicle. The positioning unit 3440f may include a GPS and various sensors.

As an example, the communication unit 3410 of the vehicle 3400 may receive map information and traffic information from an external server and store the received information in the memory unit 3430. The positioning unit 3440f may obtain the vehicle position information through the GPS and various sensors and store the obtained information in the memory unit 3430. The control unit 3420 may generate a virtual object based on the map information, traffic information, and vehicle position information and the I/O unit 3440e may display the generated virtual object in a window in the vehicle 3410, 3420. The control unit 3420 may determine whether the vehicle 3400 normally drives within a traveling lane, based on the vehicle position information. If the vehicle 3400 abnormally exits from the traveling lane, the control unit 3420 may display a warning on the window in the vehicle through the I/O unit 3440e. In addition, the control unit 3420 may broadcast a warning message regarding driving abnormity to neighboring vehicles through the communication unit 3410. According to situation, the control unit 3420 may transmit the vehicle position information and the information related to driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed in a Wireless Local Area Network (WLAN) system, the method comprising:
   generating, by a station (STA), a next generation V2X (NGV) physical protocol data unit (PPDU),
   wherein the NGV PPDU comprises a first legacy control field, a second legacy control field in which the first legacy control field is repeated, a first NGV control field, a second NGV control field in which the first NGV control field is repeated, an NGV short training field (STF), and an NGV long training field (LTF),
   wherein the second legacy control field is contiguous to the first legacy control field, the first NGV control field is contiguous to the second legacy control field, and the second NGV control field is contiguous to the first NGV control field,
   wherein the first and second NGV control fields comprise control information required for interpreting the NGV PPDU,
   wherein the control information includes 1-bit information related to a format of the NGV-LTF, and
   wherein the control information further includes (i) 1-bit information related to a bandwidth and (ii) 4-bit information related to modulation and coding scheme (MCS); and
   transmitting, by the STA, the NGV PPDU.

2. The method of claim 1, wherein the first and second NGV control fields comprise 24-bit information.

3. The method of claim 1, wherein the first and second NGV control fields comprise information related to periodicity of a midamble of the PPDU.

4. The method of claim 1, wherein the NGV PPDU further comprises a legacy-short training field (L-STF), wherein whether to apply power boosting to the L-STF is determined based on whether binary phase shift keying (BPSK) is applied to at least one field included in the NGV PPDU.

5. The method of claim 1, wherein the NGV PPDU further comprises a legacy-long training field (L-LTF), wherein whether to apply power boosting to the L-LTF is determined based on whether binary phase shift keying (BPSK) is applied to at least one field included in the NGV PPDU.

6. The method of claim 1, wherein the first NGV control field comprises an NGV signal (SIG) field, and the second NGV control field comprises a repeated NGV SIG field.

7. The method of claim 1, wherein the format of the NGV-LTF is one of an NGV-LTF-1x format or an NGV-LTF-2x format.

8. A station (STA) configured to operate in a Wireless Local Area Network (WLAN) system, the STA comprising:
   a transceiver configured to transmit or receive a wireless signal; and
   a processor coupled to the transceiver, wherein the processor is configured to:
   generate a next generation V2X (NGV) physical protocol data unit (PPDU),
   wherein the NGV PPDU comprises a first legacy control field, a second legacy control field in which the first legacy control field is repeated, a first NGV control field, a second NGV control field in which the first NGV control field is repeated, an NGV short training field (STF), and an NGV long training field (LTF),
   wherein the second legacy control field is contiguous to the first legacy control field, the first NGV control field is contiguous to the second legacy control field, and the second NGV control field is contiguous to the first NGV control field,
   wherein the first and second NGV control fields comprise control information required for interpreting the NGV PPDU,
   wherein the control information includes 1-bit information related to a format of the NGV-LTF, and
   wherein the control information further includes (i) 1-bit information related to a bandwidth and (ii) 4-bit information related to modulation and coding scheme (MCS); and
   transmit the NGV PPDU.

9. The STA of claim 8, wherein the first and second NGV control fields comprise 24-bit information.

10. The STA of claim 8, wherein the first and second NGV control fields comprise information related to periodicity of a midamble of the PPDU.

11. The STA of claim 8, wherein the NGV PPDU further comprises a legacy-short training field (L-STF), wherein whether to apply power boosting to the L-STF is determined based on whether binary phase shift keying (BPSK) is applied to at least one field included in the NGV PPDU.

12. The STA of claim 8, wherein the NGV PPDU further comprises a legacy-long training field (L-LTF), wherein whether to apply power boosting to the L-LTF is determined based on whether binary phase shift keying (BPSK) is applied to at least one field included in the NGV PPDU.

13. The STA of claim 8, wherein the first NGV control field comprises an NGV signal (SIG) field, and the second NGV control field comprises a repeated NGV SIG field.

14. The STA of claim 8, wherein the format of the NGV-LTF is one of an NGV-LTF-1x format or an NGV-LTF-2x format.

15. A method in a Wireless Local Area Network (WLAN) system, the method comprising:
   receiving, by a station (STA), a next generation V2X (NGV) physical protocol data unit (PPDU),
   wherein the NGV PPDU comprises a first legacy control field, a second legacy control field in which the first legacy control field is repeated, a first NGV control field, a second NGV control field in which the first NGV control field is repeated, an NGV short training field (STF), and an NGV long training field (LTF), wherein the second legacy control field is contiguous to the first legacy control field, the first NGV control field is contiguous to the second legacy control field, and the second NGV control field is contiguous to the first NGV control field, wherein the first and second NGV control fields comprise control information required for interpreting the NGV PPDU, wherein the control information includes 1-bit information related to a format of the NGV-LTF, and wherein the control information further includes (i) 1-bit information related to a bandwidth and (ii) 4-bit information related to modulation and coding scheme (MCS); and decoding, by the STA, the NGV PPDU.

16. The method of claim 15, wherein the format of the NGV-LTF is one of an NGV-LTF-1x format or an NGV-LTF-2x format.

* * * * *